US006006245A

United States Patent [19]
Thayer

[11] Patent Number: 6,006,245
[45] Date of Patent: Dec. 21, 1999

[54] ENHANCED FAST FOURIER TRANSFORM TECHNIQUE ON VECTOR PROCESSOR WITH OPERAND ROUTING AND SLOT-SELECTABLE OPERATION

[75] Inventor: John S. Thayer, Houston, Tex.

[73] Assignee: Compaq Computer Corporation, Houston, Tex.

[21] Appl. No.: 08/770,347

[22] Filed: Dec. 20, 1996

[51] Int. Cl.$^6$ .................................................. G06F 15/00
[52] U.S. Cl. .......................................... 708/404; 708/405
[58] Field of Search ......................... 364/725.01–725.03, 364/726.01–726.07, 727.01

[56] References Cited

U.S. PATENT DOCUMENTS

| | | | |
|---|---|---|---|
| 4,831,440 | 5/1989 | Borgers et al. | 364/725.02 |
| 4,831,574 | 5/1989 | Duhamel | 364/725.03 |
| 5,020,014 | 5/1991 | Miller et al. | 708/290 |
| 5,175,701 | 12/1992 | Newman et al. | 708/290 |
| 5,349,549 | 9/1994 | Tsutsui | 364/725.03 |
| 5,408,425 | 4/1995 | Hou | 364/725.03 |
| 5,627,956 | 5/1997 | Dao et al. | 395/443 |
| 5,636,153 | 6/1997 | Ikegaya et al. | 708/490 |
| 5,694,345 | 12/1997 | Peterson | 708/290 |

OTHER PUBLICATIONS

Implementation of Fast Fourier Transforms on Motorola's Digital Signal Processors, Motorola, Inc. (1993), pp. 3-1-4-33.

The Fast Fourier Transform, McGraw Hill (1993), pp. 27-54.

Kohn, L., et al., *The Visual Instruction Set(VIS) in Ultra SPARC™*, IEEE (1995), pp. 482–489.

Lee, Ruby B., Realtime *MPEG Video via Software Decompression on a PA–RISC Processor*, IEEE (1995), pp. 186–192.

Zhou, et al., *MPEG Video Decoding with the UltraSPARC Visual Instruction Set,* IEEE (1995), pp. 470–474.

Papamichalis, Panos, An Implementation of FFT, DCT, and other Transforms on the TMS320C30, (1990), pp. 53–119.

Gwennap, Linely, *UtraSparc Adds Multimedia Instructions,* Microprocessor Report, Dec. 5, 1994, pp. 16–18.

Goslin, Gregory Ray, *Implement DSP functions in FPGAs to reduce cost and boost performance,* EDN, Oct. 10, 1996, pp. 155–164.

Programmers's Reference Manual, Intel Architecture MMX™Technology, Chapters 2–5, Intel Corp., printed Sep. 26, 1996.

*Primary Examiner*—Emmanuel L. Moise
*Attorney, Agent, or Firm*—Akin, Gump, Strauss, Hauer & Feld, LLP

[57] ABSTRACT

An apparatus and a method perform an N-point Fast Fourier Transform (FFT) on first and second arrays having real and imaginary input values using a processor with a multimedia extension unit (MEU), wherein N is a power of two. The invention repetitively sub-divides the N-point Fourier Transform into N/2-point Fourier Transforms until only a 2-point Fourier Transform remains. Next, it vector processes the 2-point Fourier Transform using the MEU and cumulates the results of the 2-point Fourier Transforms from each of the sub-divided N/2 Fourier Transforms to generate the result of the N-point Fourier Transform.

10 Claims, 16 Drawing Sheets

ENHANCED FAST FOURIER TRANSFORM TECHNIQUE ON VECTOR PROCESSOR WITH OPERAND ROUTING AND SLOT-SELECTABLE OPERATION

BACKGROUND OF THE INVENTION

1. Field of the Invention

The present invention relates to performing Fast Fourier Transforms (FFTs) using a processor, and more specifically, to a method and an apparatus for performing FFTs using a vector processor with routable operands and independently selectable operations.

2. Description of the Related Art

The pursuit of higher performance has long been a defining feature of the computer and microprocessor industries. In many applications such as computer-aided design and graphics, higher performance is always needed to quickly translate users' commands into actions, thereby enhancing their productivity. Currently, the IBM PC computer architecture, based on Intel Corporation's X-86 family of processors, is an industry-standard architecture for personal computers. Because the IBM PC architecture is an industry standard, the architecture has attracted a broad array of software vendors who develop IBM PC compatible software. Furthermore, competition within the industry standard architecture has resulted in dramatic price performance improvements, thereby leading to a more rapid acceptance of computing technology by end users. Thus, the standardized nature of the IBM PC architecture has catapulted IBM PC compatible machines to a dominant market position.

The standardized nature of the IBM PC architecture is also a double-edged sword, for if the computer is not PC compatible, the sales potential for the computer becomes severely diminished. The reason for the limitation is that much of the existing software that runs on the PCs make explicit assumptions about the nature of the hardware. If the hardware provided by the computer manufacturer does not conform to those standards, these software programs will not be usable. Thus, PC system designers are constrained to evolutionary rather than revolutionary advances in the PC architecture in order to remain compatible with earlier IBM PC computers. However, it is desirable to take advantage of the semiconductor industry's ability to integrate large numbers of transistors per chip to satisfy the pent-up demand for more computing power in communication, multimedia and other consumer products.

The need for higher performance processors is evident in a number of applications such as communication, multimedia, image processing, voice recognition and scientific/engineering analysis which need to convert time domain data into frequency domain data via a mathematical link called a Fourier transform. Historically, time domain analysis is popular because people are analytically comfortable with analyzing events as a function of time, but the senses are more directed to the frequency domain. For instance, when listening to music or speech, humans do not hear individual pressure variations of the sound as they occur so quickly in time. Instead, what is heard is the changing pitch or frequency. Similarly, human eyes do not see individual oscillations of electromagnetic fields or light. Rather, colors are seen. In fact, humans do not directly perceive any fluctuations or oscillations which change faster than approximately 20 times per second. Any faster changes manifest themselves in terms of the frequency or the rate of change, rather than the change itself. Thus, the concept of frequency is as important and fundamental as the concept of time. Furthermore, in many applications, transform analysis is popular because it is often easier to formulate problems in the frequency domain rather than the time domain in designing systems. The central ideal of transform theory is that some information about the system, such as the time or spatial domain description can be transformed into an equivalent description that simplifies design or analysis.

As many natural or man-made waveforms are periodic and can be expressed as a sum of sine waves, discrete data points can be taken and translated into the frequency domain using a Discrete Fourier Transform (DFT) rather than computing the continuous spectra of the signal. In general, the types of Fourier transform applications include: number based, pattern based, and convolution based. Examples of number based applications include spectrum analysis which is used in instrumentation, audio-video processing, velocity estimation and radar signal processing. With respect to pattern based applications, many problems involve the recognition and detection of signals with a specific frequency content, such as a spectral pattern in a speech pattern. In the pattern based application, conversion to frequency domain is often a small step in the overall task and it is important that the conversion process be fast to allow for sufficient time to perform other computationally intensive pattern matching techniques. Finally, in convolution based applications, the Fourier transform is used as a simple mathematical tool to perform general filtering.

The Fourier Transform of an analog signal $\tilde{a}(t)$, expressed as:

$$A(\omega) = \int_{-\infty}^{\infty} \tilde{a}(t) e^{-j\omega t} dt$$

determines the frequency content of the signal $\tilde{a}(t)$. In other words, for every frequency, the Fourier transform $A(\omega)$ determines the contribution of a sinusoid of that frequency in the composition of the signal $\tilde{a}(t)$. For computations on a digital computer, the signal $\tilde{a}(t)$ is sampled at discrete-time instants. If the input signal is digitized, a sequence of numbers $\tilde{a}(n)$ is available instead of the continuous time signal $\tilde{a}(t)$. Then the Fourier transform takes the form $$A(e^{j\omega}) = \sum_{n=-\infty}^{\infty} \tilde{a}(n) e^{-j\omega n}$$

The resulting transform $A(e^{j\omega})$ is a periodic function of $\omega$, and only needs to be computed for only one period. The actual computation of the Fourier transform of a stream of data presents difficulties because $A(e^{j\omega})$ is a continuous function in $\omega$. Since the transform must be computed at discrete points, the properties of the Fourier transform led to the definition of the Discrete Fourier Transform (DFT), given by $$A(k) = \sum_{n=0}^{N-1} \tilde{a}(n) e^{-\frac{j2\pi k n}{N}}$$

Where $\tilde{a}(n)$ consists of N points $\alpha(0), \alpha(1), \ldots, \alpha(N-1)$, the frequency-domain representation is given by the set of N points $A(k)$, $k=0, 1, \ldots, N-1$. The previous equation becomes $$A(k) = \sum_{n=0}^{N-1} \tilde{a}(n) W_N^{nk}$$

where $W_N^{nk}=e^{-j2\pi nk/N}$. The factor $W_N$ is sometimes referred to as the twiddle factor.

The amount of computation involving evaluating the convolution integral becomes particularly large when its impulse response H(t) has a long time duration. Thus, DFTs are computationally expensive: for every frequency point, N−1 complex summations and N complex multiplications need to be performed. With N frequency points, and counting two real sums for every complex summation and four real multiplications and two real sums for every complex multiplication, the complexity of a N-point DFT is $4N^2-2N$ real summations and $4N^2$ real multiplications. Thus, for each 1,024 point DFT, 4,194,304 real multiplications are required. Typical applications requires a number of these 1,024 point DFTs to be performed per second in real time. Hence, the applications of DFTs had been limited until the advent of the Fast Fourier transforms (FFTs).

Many variations exist in the formulation of the FFT process. Among the basic approaches where $N=2^r$ and r is an integer, one approach—decimation in time—is based upon separating $\tilde{a}(n)$ into two sequences of length N/2 comprised of the even and odd-indexed samples, respectively, i.e., $$\tilde{A}(k) = \sum_{n=0}^{N-1} \tilde{a}(n) W^{kn}$$
$$= \sum_{neven} \tilde{a}(n) W^{kn} + \sum_{nodd} \tilde{a}(n) W^{kn}$$
$$= \sum_{m=0}^{(N/2)-1} \tilde{a}(2m)(W^2)^{km} + W^k \sum_{m=0}^{(N/2)-1} \tilde{a}(2m+1)(W^2)^{km}$$

Each of these summations is recognized as being simply an N/2-point DFT of the respective sequence because $$W^2 = e^{-2j(2\pi/N)} = e^{-ij2\pi/(N/2)}$$

Hence, if the DFT $\tilde{A}_e(k)$ is generated for the even-indexed sequence $\tilde{a}(0), \tilde{a}(2), \ldots, \tilde{a}(N-2)$ and the DFT $\tilde{A}_0(k)$ for the odd-indexed sequence $\tilde{a}(1), \tilde{a}(3), \ldots, \tilde{a}(N-1)$, the overall DFT is arrived at by combining the sequences as $$\tilde{A}(k) = \tilde{A}_e(k) + W^k \tilde{A}_0(k)$$

As discussed earlier, the complex coefficients $W^k$ are known as twiddle factors. The N/2-point DFT's $\tilde{A}_e(k)$ and $\tilde{A}_0(k)$ are periodic in k with period N/2, and thus their values for $k \geq N/2$ need not be recomputed, given those for $0 \leq k < N/2$. This process is then applied again and again until only a 2-point DFT's remains to be computed. That is, each N/2-point DFT is computed by combining two N/4-point DFT's, each of which is computed by combining two N/8-point DFT's, and continuing on thereafter, for r stages since $N=2^r$. The initial 2-point DFT's require coefficients of only ±1.

The FFT routine therefore reduces the complexity from a $N^2$ order of complex multiplications and additions in the case of a DFT to a $\log_2 N$ order complexity, each of which requires up to N complex multiplications by twiddle factors and N complex additions. An important aspect of the FFT algorithm is that it can be computed in place in memory. That is, if the input array $\tilde{a}(n)$ is not needed in other processing, it can be overwritten with intermediate results of successive stages until it finally contains the DFT $\tilde{A}(k)$. Hence, except for a few working registers, no additional memory is required. Thus, where the outputs of the ith stage is denoted as $\tilde{A}hd\ i(k)$, the FFT process consists of pairs of computations of the form $$\tilde{A}_i(k) = \tilde{A}_{i-1}(k) + W^m \tilde{A}_{i-1}(l)$$

$$\tilde{A}_i(l) = \tilde{A}_{i-1}(k) + W^{m+N/2} \tilde{A}_{i-1}(l)$$

where the initial inputs $\tilde{A}_0(k)$ are the $\tilde{a}(n)$ in bit-reversed order. This basic computational pair is known as an FFT butterfly computation.

After completing each butterfly, the input pairs $\tilde{A}_{i-1}(k)$ and $\tilde{A}_{i-1}(l)$ can be replaced in memory by the output pair $\tilde{A}_i(k)$ and $\tilde{A}_i(l)$ because they will not be needed any more. Hence, the computation can proceed in place. The factor $W^{m+N/2}$ suggests an additional saving of a factor of two in computation because $W^{N/2}=-1$. Therefore, each butterfly can be computed with only one complex multiplication.

Many different variations of the FFT algorithm are possible depending upon whether the input or output needs to be in bit-reversed order, the need for in-place computation, and the associated bookkeeping complexity. For example, if the input array is in natural order and retains the use of in-place butterflies, the resulting output array is in bit-reversed order. If both inputs and outputs are needed to be in natural order, then in-place computation is destroyed, and the bookkeeping (control code or circuitry) is more complex. Alternatively, a transpose network can be formed for a particular decimation-in-time (DIT) process by reversing the direction of each branch in the network. This produces a new class of FFT process known as the decimation-in-frequency (DIF) process.

As discussed above, the total load for an N-point DFT is $4N^2-2N$ addition and $4N^2$ multiplications. In contrast, the FFT algorithms require $N\log_2 N$ computations. Thus, for a 1024-point DFT, this is a reduction by a factor of $N^2$ over $N\log_2 N$, or roughly 100 to 1. Even with the 100 to 1 reduction, if computations on typical data rate at 20,000 samples per second, a computation for each 200 1024-point FFTs per second corresponds to 8 million adds and 8 million multiply operations per seconds, still a significant computational load for a Pentium processor is utilized. Not surprisingly, signal processing applications with insatiable needs for processing power such as radar, sonar, image processing and communications can not run in real-time on personal computers yet.

Although the number of frequency domain applications is as large as the more conventional time domain applications, the difficulty of implementing frequency domain applications as well as the cost of the frequency domain implementation has limited the viability of solving problems in the frequency domain. Thus, an enhanced process for quickly and efficiently performing FFTs is needed. Furthermore, it is desirable to accelerate the speed of performing FFTs without adversely affecting the compatibility of the personal computer with the installed software base.

SUMMARY OF THE INVENTION

The present invention provides an apparatus and a method to perform an N-point Fast Fourier Transform (FFT) on first and second arrays having real and imaginary input values using a vector processor with operand routing and operation selection, wherein N is a power of two. The invention repetitively sub-divides a N-point Fourier Transform into N/2-point Fourier Transforms until only 2-point Fourier Transforms remain. Next, it vector processes the 2-point Fourier Transforms using the vector processor with operand routing and operation selection and accumulates the results of the 2-point Fourier Transforms from each of the subdivided N/2 Fourier Transforms to generate the result of the N-point Fourier Transform. In the preferred embodiment with 1024-point FFT requirements, the transformation is carried out in ten passes.

In the first pass, the invention loads a plurality of input values from the first array into a first vector register and input values from the second array into a second vector register. Next, it vector adds the second vector register to the first vector register and vector subtracts the second vector register from the first vector register.

In the second pass, after loading a plurality of input values from the first array into a first vector register and input values from the second array into a second vector register, the routine vector adds the imaginary input values in the second vector register to the real input values in the first vector register and simultaneously vector subtracts the real input values in the second vector register from the imaginary input values in the first vector register. The routine then vector subtracts the imaginary input values in the second vector register from the real input values in the first vector register and simultaneously vector adds the real input values in the second vector register to the imaginary input values in the first vector register.

In passes 3–8, the present invention performs a vector multiply operation between real components of a twiddle factor and the second vector register and storing the results in a third vector register. Next, the invention performs a positive vector multiply accumulate operation on the imaginary components of the twiddle factor and the real input values in the third vector register and simultaneously performs a negative vector multiply accumulate operation on the imaginary input values in the third vector register. The invention then vector subtracts the third vector register from the first vector register and vector adds the third vector register to the first vector register to arrive at the new values for A and B. Passes 9 and 10 are similar to passes 3–8, with the exception that the twiddle factors are copied over two pairs and four pairs of values.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
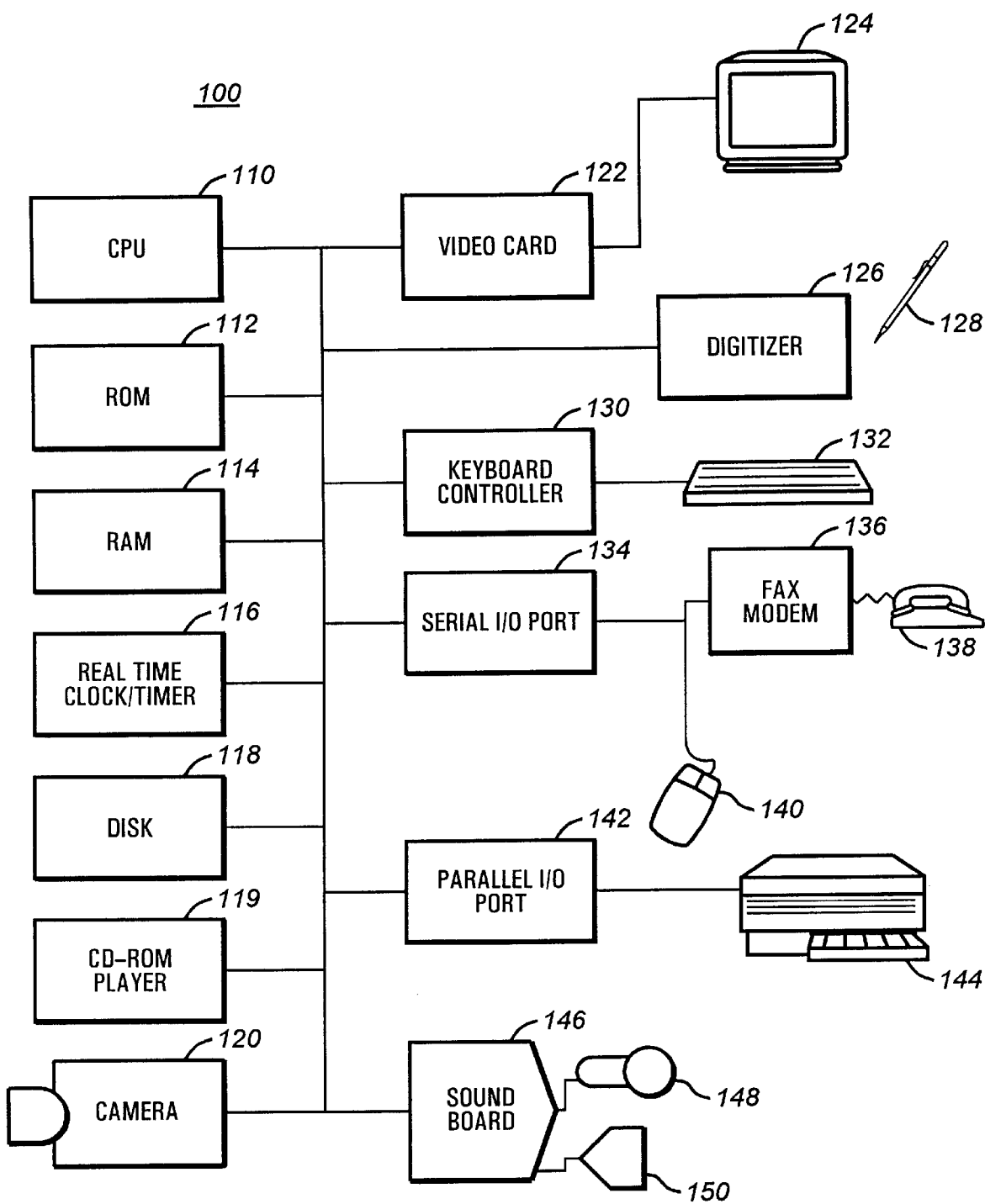
FIG. 1 is a block diagram of a computer system having a processor and a multimedia extension unit of the present invention.
Figure 2:
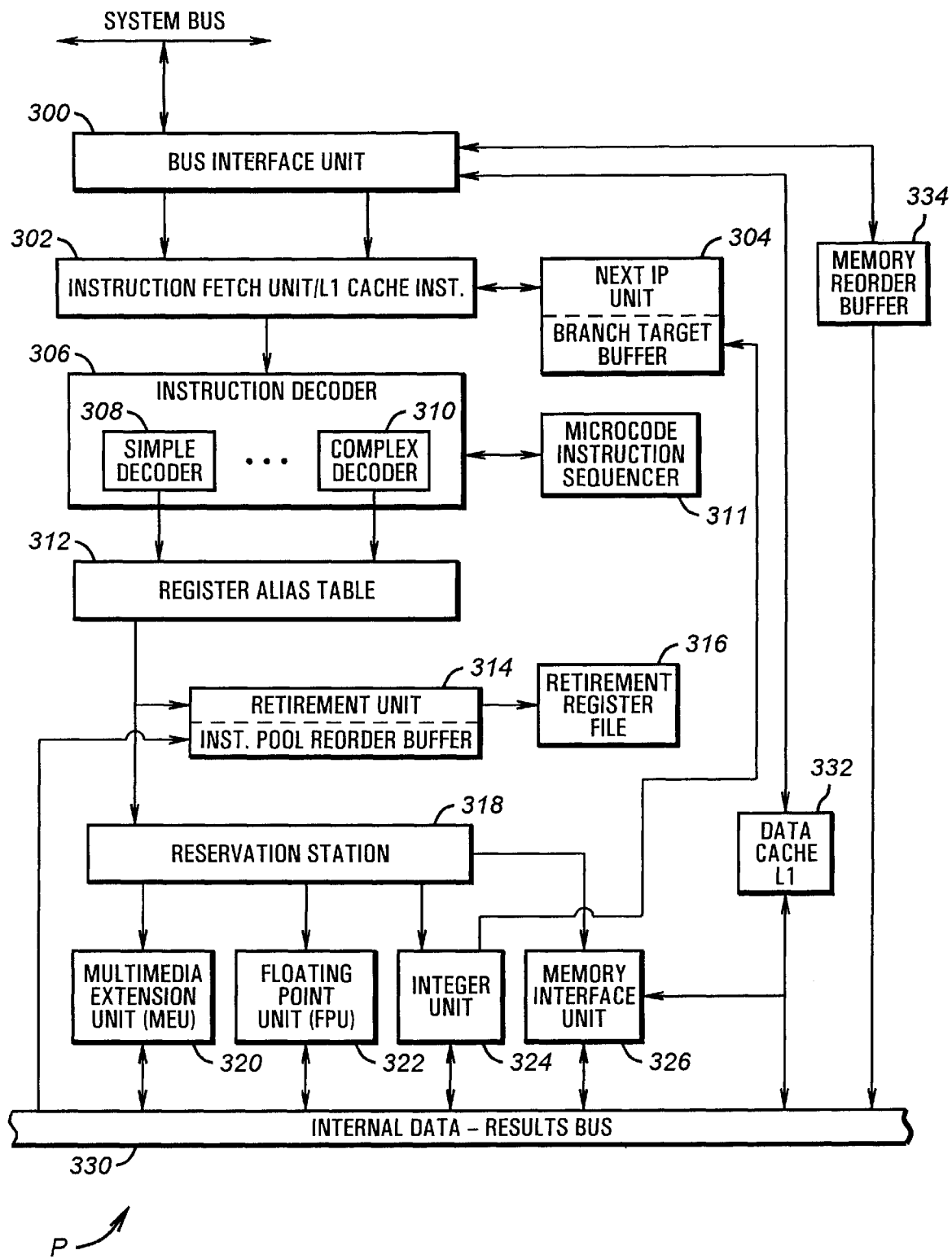
FIG. 2 shows a micro-architecture of the processor and the multimedia enhanced unit of FIG. 1.

Turning now to the drawings, FIG. 1 shows a block diagram of a computer 100. In FIG. 1, a central processing unit (CPU) 110 provides processing power for the computer system 100. The CPU 110 is preferably an Intel Pentium-Pro® processor with an multimedia extension unit (MEU), as shown in FIG. 2. However, a number of other microprocessors suitably equipped with an MEU may be used, including a PowerPC microprocessor, an R4000 microprocessor, a Sparc microprocessor, or an Alpha microprocessor, among others. The CPU 110 is connected to a read only memory (ROM) 112. The ROM 112 provides boot code such as a system BIOS software that boots up the CPU 110 and executes a power-on self test (POST) on the computer system 100.

In addition, the CPU 110 is connected to a random access memory (RAM) 114. The RAM 114 allows the CPU 110 to buffer instructions as well as data in its buffer while the computer 100 is in operation. The RAM 114 is preferably a dynamic RAM array with 32 megabytes of memory. The CPU 110 is also connected to a real time clock and timer 116. The real time clock and timer 116 stores the date and time information for the CPU 110. Furthermore, the real time clock and timer 116 has a lithium backup battery to maintain the time information even when the computer system 100 is turned off.

The CPU 110 is also connected to a disk storage device 118. The disk storage device 118 stores executable code as well as data to be provided to the CPU 110. Additionally, the CPU 110 is connected to a CD-ROM drive. Typically, an IBM PC compatible computer controls the disk drive 118 and the CD-ROM player 119 via an Intelligent Drive Electronics (IDE) interface.

Additionally, the CPU 110 is connected to a camera 120. The camera 120 supports video conferencing between the user and other users. The camera 120 essentially consists of a lens, a charge-coupled-device (CCD) array, and an analog to digital converter. The lens focuses light onto the CCD array, which generates voltages proportional to the light. The analog voltages generated by the CCD array are converted into a digital form by the analog to digital converter for processing by the CPU 110.

The CPU 110 is also connected to a video card 122. On the back of the video card 122 are one or more jacks.

Connectors for monitors can be plugged into the jacks. The connectors, which are adapted to be plugged into the jacks of the video card 122, eventually are connected to the input of a video monitor 124 for display.

A pen-based user interface is also provided. A digitizer 126 is connected to the CPU 110 and is adapted to capture user input. Additionally, a pen 128 is provided to allow the user to operate the computer. The pen 128 and digitizer 126 in combination supports another mode of data entry in addition to a keyboard 132.

The video monitor 124 receives output video signals from the CPU 110 and displays these signals to the user. The keyboard 132 is connected to a keyboard controller 130 and provides input information to the CPU 110. Additionally, one or more serial input/output (I/O) ports 134 are provided in the computer system 100. Connected to the serial I/O ports 134 are a plurality of peripherals, including a mouse 140 and a facsimile modem 136. The facsimile modem 136 in turn is connected to a telephone unit 138 for connection to an Internet service provider, for example. Preferably, the modem 136 is a 28.8 kilobits per second modem (or greater) that converts information from the computer into analog signals transmitted by ordinary phone lines or plain old telephone service (POTS). Alternatively, the modem 136 could connect via an integrated service digital network (ISDN) line to transfer data at higher speeds.

Furthermore, a parallel input/output (I/O) port 142 is provided to link to other peripherals. Connected to the parallel I/O port 142 is a laser printer 144. Additionally, a microphone 148 is connected to a sound board 146 which eventually provides input to the CPU 110 for immediate processing or to a disk drive 118 for offline storage. The sound board 146 also drives a music quality speaker 150 to support the multimedia-based software. As multimedia programs use several medium, the multimedia computer system of the present invention integrates the hardware of the computer system 100 of the present invention. For example, the sound board 146 is used for sound, the monitor 124 is used to display movies and the CD-ROM player 119 is used for audio or video. In this manner, sounds, animations, and video clips are coordinated to make the computer session more friendly, usable and interesting.

Turning now to FIG. 2, a functional block diagram of the processor microarchitecture employed by the present invention is shown. The processor of the present invention is preferably based on an Intel-compatible Pentium-Pro microprocessor. The mode employed by the present invention is in addition to the existing modes of the 486 and Pentium processors, and unless otherwise indicated, the operation and features of the processors remain unchanged. Familiarity with the operation of the 486, Pentium and Pentium Pro are assumed in this description. For additional details, reference should be made to the appropriate data book. However, the invention could also be used in earlier processor generations such as the Intel Pentium™, 80486™, 80386™, 80286™, and 8086™ microprocessors. The use of the features of the multimedia extension unit could also be used with other types of microprocessors, including without limitation, the Power PC architecture, the Sparc architecture, and the MIPS R4000 architecture. For purposes of this disclosure, the terms microprocessor and processor can be used interchangeably.

In FIG. 2, the processor P employed by the present invention interacts with the system bus and the Level 2 cache (not shown) via a bus interface unit 300. The bus interface unit 300 accesses system memory through the system bus. Preferably, the bus interface unit 300 is a transaction oriented 64-bit bus such that each bus access handles a separate request and response operation. Thus, while the bus interface unit 300 is waiting for a response to one bus request, it can issue additional requests. The interaction with the Level 2 cache via the bus interface unit 300 is also transaction oriented. The bus interface unit 300 is connected to a combination instruction fetch unit and a Level 1 instruction cache 302. The instruction fetch unit of the combination unit 302 fetches a 32-byte cache line per clock from the instruction cache in the combination unit 302. The combination unit 302 is also connected to an instruction pointer unit and branch target buffer combination 304. The branch target buffer in turn receives exception/interrupt status and branch misprediction indications from an integer execution unit 324, as discussed below.

Additionally, the instruction fetch unit/L1cache combination 302 is connected to an instruction decoder 306. The instruction decoder 306 contains one or more simple decoders 308 and one or more complex decoders 310. Each of decoders 308 and 310 converts an instruction into one or more micro-operations ("micro-ops"). Micro-operations are primitive instructions that are executed by the processor's execution unit. Each of the micro-operations contains two logical sources and one logical destination per micro-operation.

The processor P has a plurality of general purpose internal registers which are used for actual computation, which can be either integer or floating point in nature. To allocate the internal registers, the queued micro-ops from the instruction decoder 306 are sent to a register alias table unit 312 where references to the logical register of the processor P are converted into internal physical register references. Subsequently, allocators in the register alias table unit 312 add status bits and flags to the micro-ops to prepare them for out of order execution and send the resulting micro-ops to an instruction pool 314.

The instruction pool 314 is also connected to a reservation station 318. The reservation station 318 also receives the output of the register alias table 312. The reservation station 318 handles the scheduling and dispatching of micro-ops from the instruction pool 314. The reservation station 318 supports classic out-of-order execution where micro-ops are dispatched to the execution unit strictly according to data flow constraints and execution resource availability to optimize performance.

The reservation station 318 is in turn connected to a plurality of execution units, including a multimedia extension unit (MEU) 320, a floating point unit (FPU) 322, an integer unit (IU) 324, and a memory interface unit (MIU) 326. The MEU 320, FPU 322, IU 324 and MIU 326 are in turn connected to an internal data-results bus 330. The internal data-results bus 330 is also connected to the instruction pool 314, a Level 1 data cache 332 and a memory reorder buffer 334. Furthermore, the Level 1 data cache 332 and the memory reorder buffer 334 are connected to the bus interface unit 300 for receiving multiple memory requests via the transaction oriented bus interface unit 300. The memory reorder buffer 334 functions as a scheduling and dispatch station to track all memory requests and is able to reorder some requests to prevent data blockage and to improve throughput.

Turning now to the execution units, the memory interface unit 326 handles load and store micro-ops. Preferably, the memory interface unit 326 has two ports, allowing it to process the address on a data micro-op in parallel. In this manner, both a load and a store can be performed in one clock cycle. The integer unit 324 is an arithmetic logic unit (ALU) with an ability to detect branch mispredictions. The floating point execution units 322 are similar to those found in the Pentium processor. From an abstract architectural view, the FPU 322 is a coprocessor that operates in parallel with the integer unit 324. The FPU 322 receives its instruction from the same instruction decoder and sequencer as the integer unit 324 and shares the system bus with the integer unit 324. Other than these connections, the integer unit 324 and the floating point unit 322 operate independently and in parallel.

In the preferred embodiment, the FPU 322 data registers consist of eight 80-bit registers. Values are stored in these registers in the extended real format. The FPU 322 instructions treat the eight FPU 322 data registers as a register stack. All addressing of the data registers is relative to the register on top of the stack. The register number of the current top of stack register is stored in the top. Load operations decrement the top by one and load a value into the new top of stack register, and store operations store the value from the current top register in memory and then increment top by one. Thus, for the FPU 322, a load operation is equivalent to a push and a store operation is equivalent to a pop in the conventional stack.

Referring now to the multimedia extension unit (MEU) 320, the MEU 320 enhances the instruction set to include vector instructions, partitioned instructions operating on small data elements, saturating arithmetic, fixed binary point data, data scaling support, multimedia oriented ALU functions, and flexible operand routing. To preserve compatibility and minimize the hardware/software impact, the MEU 320 uses the same registers as the FPU 322. When new multimedia instructions are executed on the MEU 320, the registers of the FPU 322 are accessed in pairs. As the FPU 322 registers each have 80 bits of data, the pairing of the FPU 322 registers effectively creates four 160-bit wide registers, as further discussed below. Furthermore, the MEU 320 adds newly defined instructions which treat registers as vectors of small fixed point data values rather than large floating point numbers. Since the operating system saves the entire state of the FPU 322 as necessary during context switches, the operating system needs not be aware of the new functionality provided by the MEU 320 of the present invention. Although the disclosed system contemplates that the MEU 320 and the FPU 322 share logic or registers, the processor P could simply have snooping logic that maintains coherency between register values in completely separate MEU 320 and FPU 322 sections.

With respect to status and control bits, the FPU 322 has three registers for status and control: status word, control word, and tag word. These FPU 322 registers contain bits for exception flags, exception masks, condition codes, precision control, routing control and stack packs. The MEU 320 does not use or modify any of these bits except for the stack pack bits, which is modified because the MEU 320 result values are often not valid floating point numbers. Thus, anytime a MEU instruction is executed, the entire FPU tag word is set to 0xffffh, marking all FPU 322 registers as empty. In addition, the top of stack pointer in the FPU 322 status words (bits 11–13) is set to 0 to indicate an empty stack. Thus, any MEU 320 instruction effectively destroys any floating point values that may have been in the FPU 322. As the operating system saves and restores the complete FPU state for each task, the destruction of floating point values in the FPU 322 is not a problem between tasks. However, appropriate software action may need to be taken within a single task to prevent errors arising from modifications to the FPU 322 registers.

The sharing of the registers of the FPU 322 and the MEU 320 avoids adding any new software visible context, as the MEU 320 does not define any new processor status, control or condition code bits other than a global MEU extension enable bit. Furthermore, the MEU 320 can execute concurrently with existing instructions on the registers of the integer unit 324. Therefore, the CPU 110 logic is well utilized as the MEU 320 is efficiently dedicated to signal processing applications while the FPU 322 is dedicated to floating point intensive applications and the integer unit 324 handles addressing calculations and program flow control. Additionally, the MEU 320 allows for scalability and modularity, as the MEU 320 does not change the integer or load/store units. Thereby, the CPU 110 core design is not impacted when the MEU 320 is included or excluded from the processor P.

Figure 3:
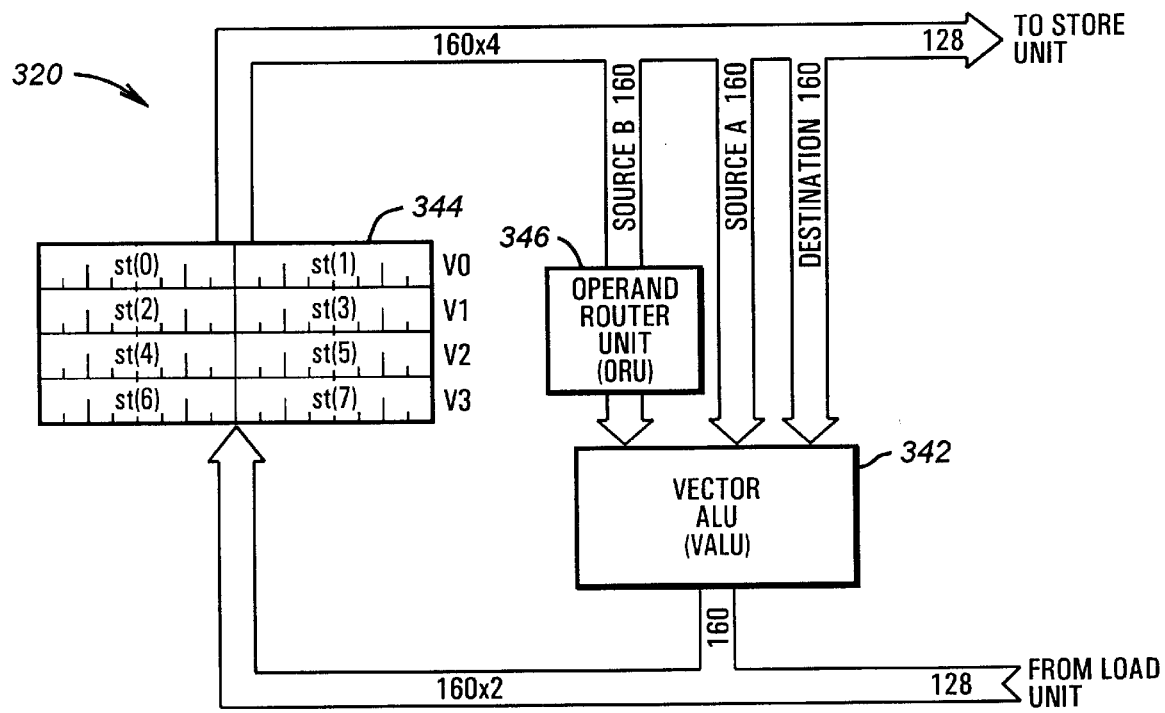
FIG. 3 is a more detailed block diagram of the multimedia extension unit of FIG. 2.

Referring now to FIG. 3, a more detailed block diagram of the MEU 320 is shown. The MEU 320 contains a vector arithmetic logic unit (VALU) 342. The VALU 342 is in turn connected to a plurality of vector registers 344, preferably four. These vector registers are preferably the same registers as those present in the FPU 322.

In the MEU 320, the FPU registers 344 are accessed in pairs. As each of the FPU 322 registers is 80 bits in width, the pairing of the FPU 322 registers effectively creates four 160-bit wide vector registers 344. Thus, as shown in FIG. 3, the register pairs of the FPU 322 are referred to as V0, V1, V2 and V3 and correspond to the physical FPU 322 registers. For instance, FPU 322 physical register 0 is the same as the lower half of the MEU 320 vector register V0. Similarly, FPU 322 physical register 1 is the same as the upper half of MEU 320 vector register V0, while the FPU 322 physical register 7 is the same as the upper half of the MEU 320 vector register V3. Furthermore, in the MEU 320 of FIG. 3, the stack based access model of the 80x87 floating point instructions is not utilized. Instead, the 160-bit registers V0 –V3 are partitioned to form vectors of 10-bit or 20-bit data elements.

The output of the vector registers 344 are subsequently provided to an operand router unit (ORU) 346 and the VALU 342. Each vector instruction controls both the ORU 346 and the VALU 342. In combination, the ORU 346 and the VALU 342 allows the processor P to simultaneously execute software using flexible operand routing and multiple operation. Referring to the flow graph of FIG. 14, for example, the VALU 342 operates on the nodes and the ORU 346 implements diagonal interconnections. Thus, because vector arithmetic of different types and data movement can be processed in groups simultaneously, the VALU 342 and the ORU 346 provide high performance.

The VALU 342 can perform a variety of operations, including addition, subtraction, multiply, multiply/accumulate, shifting and logical functions. The VALU 342 assumes that each of the 160-bit registers 344 is partitioned into 10-bit or 20-bit source operands and destinations. Thus, the VALU 342 can execute 8 or 16 individual operations per instruction. A three-operand instruction format is supported by the VALU 342: source A, source B, and destination registers for each instruction. Additionally, certain operations, such as multiply/accumulate use the destination as an implied third source operand.

The MEU 320 operates primarily in fixed point operation. The difference between fixed point and integer data is the location of the binary point. In the MEU 320, the binary point is assumed to be to the left of the most significant bit. Numbers in the MEU 320 can be considered as fractions that nominally occupy the range from plus 1 to minus 1. The advantage of this format over the integer format is that the numerical magnitude of the data does not grow with each multiply operation as the product of two numbers in the plus 1 to minus 1 ranges yields another number in the plus 1 to the minus 1 range. Therefore, it is less likely the data will need to be rescaled.

The MEU 320 takes advantage of the full 80-bit width of the FPU 322 register set. The MEU 320 loads data from memory in 8-bit or 16-bit quantities, but the data is expanded to 10 bits or 20 bits as it is placed into the vector registers 344 (V0 . . . V3). The extended provision provides two benefits: (1) simplifying support for signed and unsigned data; and (2) helping to avoid overflow conditions and round-off errors on intermediate results.

Furthermore, the VALU 342 performs all arithmetic operations using saturating arithmetic. Saturating arithmetic differs from the more familiar modular arithmetic when overflows occur. In modular arithmetic, a positive value that is too large to fit into destination wraps around and becomes very small in value. However, in saturating arithmetic, the maximum representable positive value is substituted for the oversized positive value. This operation is often called clipping.

Additionally, the VALU 342 performs adds, subtracts and Boolean operations on 10-bit to 20-bit quantities. If the result of an add or subtract is outside of the representable range, the result is clipped to the largest positive or negative representable value. However, Boolean operations are not clipped. Furthermore, the result of the add, subtract, and move operations may optionally be shifted right by one bit before being stored to the destination. This scaling can be used to compensate for the tendency of data magnitude to grow with each add or subtract operation. Multiply operations take two 10-bit or 20-bit signed factors and generate a 19-bit or 39-bit signed product. The least significant 9 or 19 bits of the product are rounded and dropped before stored into the 10-bit or 20-bit destination register. As simple multiply operations typically do not overflow, they do not need to be clipped. However, multiply/accumulate operations do require clipping.

Figure 4:
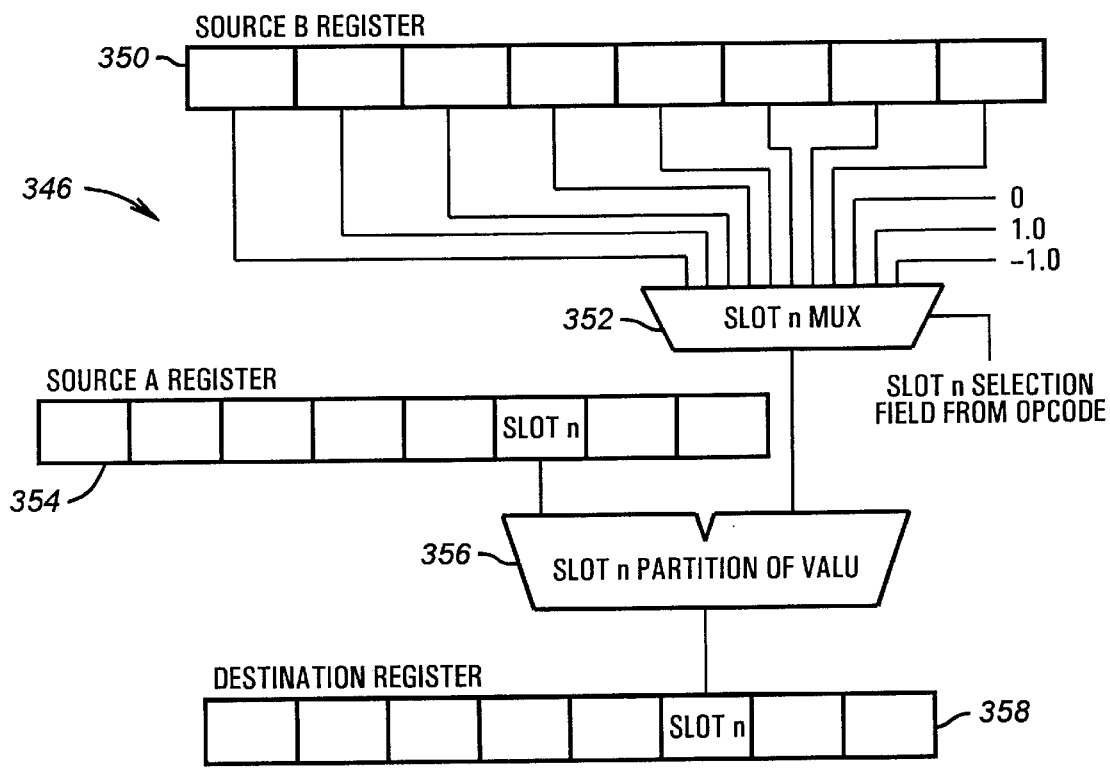
FIG. 4 shows in more detail an operand router unit of FIG. 3.

Turning now to FIG. 4, the details of the operand routing unit 346 are shown. The ORU 346 allows operands to be flexibly moved within and between large 160-bit registers. As vector processors generally must load data from memory in large monolithic chunks, the ability to route operands is useful for the MEU 320. The ability to flexibly access and route individual operands, the ORU 346 provides the ability to "swizzle" the data partitions in a vector register as data moves through it. The swizzling operation allows the operands to be shuffled as needed by the application concurrently with the execution of the vector ALU operations. Thus, a smaller amount of data is required to yield useful results. Thus, the load and store units are less likely to be overloaded, leaving greater bandwidth for the integer, non-vector units to perform work.

As shown in FIG. 4, the ORU 346 is essentially an enhanced 8×8 crossbar switch which works with a plurality of slots. In the preferred embodiment, eight slots are provided for each of a source B register 350, source A register 354 and a destination register 358. The source B register 350 is connected to a multiplexer 352. The output of the multiplexer 352 and the source A register 354 is provided to a VALU partition 356. The VALU partition 356 in turn is connected to the destination register 358.

In the vector source B register 350, each slot contains either one 20-bit partition or two 10-bit partitions, depending on the partition width as specified in the vector instruction. For 10-bit partitions, the MEU 320 simultaneously performs independent but identical operations on the two partitions in a slot. Furthermore, each slot in the destination register 358 can independently receive one of eleven values: the value in one of the eight source slots 350 and 354, a Z value (0), a P value (1) or an N value (−1). During the execution of codes by the MEU 320, all vector instructions use a single opcode format that simultaneously controls the VALU 342 and the ORU 346. This format is approximately eight bytes long. Each instruction encodes the two source registers, the destination register, the partition size, and the operations to be performed on each partition. In addition, each instruction encodes the ORU 346 routing settings for each of the eight slots. Normally, any two of the vector operations defined in the following table may be specified in a single vector instruction. Each slot can be arbitrarily assigned either of the two operations. The vector instructions offered by the MEU 320 is shown in Tables 1 and 2, as follows:

TABLE 1

Vector Operation Descriptions

| Category | Mnemonic | Description |
| --- | --- | --- |
| Add | add add_ | Add sourceA and sourceB partitions, place sum in destination. add_ arithmetically shifts the result right by one bit (computes average). |
| Subtract | sub sub_ sbr sbr_ | Subtract partitions. sub does sourceA - source B; sbr does source B - source A. sub_ and sbr_ arithmetically shift the result right by one bit. |
| Accumulate/ Merge | acum acum_ | Add the contents of the destination register partition to the sourceB partition and place the sum in the destination. acum_ arithmetically shift the result right by one bit. |
| Negate | neg | Negate sourceB partition and place in destination. |
| Distance | dist | Subtract partitions then perform absolute value. |
| Multiply | mul mac | mul multiplies the sourceA partition by the sourceB partition and places the product in the destination. mac multiplies sourceA by source B and adds the product to the destination. |
| Conditional Move | mvz mvnz mvgez mvlz | Conditionally move partition in sourceB register to partition in destination register depending on sourceA partition's relationship to zero. |
| Scale | asr n asl n | Arithmetically shifts the operand in sourceB by amount n. N can be between 1 and 4 inclusive. asl uses saturating arithmetic and shifts zeros in from the right. asr copies the sign bit from the left. |
| Logical | lsr n | Logically shifts the operand in sourceB by amount n. N can be between |

TABLE 1-continued

Vector Operation Descriptions

| Category | Mnemonic | Description |
|---|---|---|
| Shift | lsl n | 1 and 4 inclusive. Zeros are shifted in from the left or right. lsl uses modulo arithmetic; it does not clip. |
| Boolean | false nor bnota nota anotb notb xor nand and nxor b borna a aornb or true | Perform one of sixteen possible Boolean operations between sourceA and sourceB partitions. (The operations are listed in order of their canonical truth table representations.) |
| Round | md n | Add the constant (1*LSb << n − 1) to sourceB, then zero out the n lowest bits. n can be between 1 and 4 inclusive. Implements "round-to-even" method: if (sourceB < n:0 >== 010 . . . 0), then don't do the add. |
| Magnitude Check | mag | This operation can be used to implement block floating point algorithms. If the number in sourceB has fewer consecutive leading 1's or 0's than the number in sourceA, then sourceB is placed in the destination; otherwise sourceA is placed in the destination. Only the eight leftmost bits of the values are used in the comparison; if both sourceA and sourceB start with a run of more than 7 bits, then the result is the value from sourceA. This operation is an approximation of the "C" statement: (abs(sourceA) <= abs(sourceB)) ? sourceA : source B. |
| SourceA Partition Shift | pshra | For each slot s, copy the contents of slot s + 1 from the sourceA register to slot s in the destination register. (If this operation is used in slot 7, then the result is immediate zero). This operation can be used to efficiently shift data inputs and outputs during convolutions (FIR filters, etc.). |
| Slot Routing | blbh ahbh albl | These operations are defined only for 20-bit partitions. They are used to route 10-bit data across the even/odd "boundary" that the ORU doesn't cross. blbh swaps the upper and lower halves of the sourceB operand and places the result in the destination. ahbh concatenates the upper half of the sourceA with the upper half of sourceB. albl concatenates the lower half of sourceA with the lower half of sourceB. |
| Store Conversion | ws2u | This operation is used prior to storing 16-bit unsigned data from a 20-bit partition. If bit 19 of sourceB is set, the destination is set to zero. Otherwise, this operation is the same as lsl 1. |
| Extended-Precision | emach emacl emaci carry | These operations are used to perform multiply-and-accumulate functions while retaining 36 bits of precision in intermediate results; they are only defined for 20-bit partitions. emach is the same as mac, except that no rounding is done on the LSb. emacl multiplies sourceA and sourceB, then adds bits <18:3> of the 39-bit intermediate product to bits <15:0> of the destination, propagating carries through bit 19 of the destination. emaci is similar to emacl, except that bits <19:16> of the destination are cleared prior to the summation. The carry operation logically shifts sourceB right by 16 bits, then adds the result to SourceA. |

TABLE 2

Operation Synonyms

| Category | Alias Name | Actual Operation | Description |
|---|---|---|---|
| Move | mov | b | Move the sourceB register partition to the destination partition. |
| SourceB | mov_ | asrl | mov_ arithmetically shifts the results right by one bit. |
| Move SourceA | mova | a | Copy the partition in sourceA to the destination. |
| SourceA Absolute Value | absa | dist ( . . . Z . . . ) | Compute the absolute value of the sourceA partition |
| Unmodified Destination | dest | acum ( . . . Z . . . ) | Leave the destination partition unchanged. |
| Average | avg | add_ | Compute average of two values. |

Turning now to load and store instructions, each type of operation has two versions: one that moves 16 bytes of memory and one that moves 8 bytes of memory. The 8-byte versions are defined because this is often the amount of data needed; loading or storing 16 bytes in these cases would be wasteful. Further, the 8-byte loads and stores can be used to convert between byte-precision data and word-precision data. The 16-byte loads and stores operate on the entire 160-bit vector register. The 8-byte stores for 20-bit partitions store only the values from slots 4 through 7. The 8-byte stores for 10-bit partitions store only the upper half of each of the eight slots. The 8-byte loads for 20-bit partitions load the memory data to slots 4 through 7; slots 0 through 3 are set to zero. The 8-byte loads for 10-bit partitions load the memory data to the upper half of each slot; the lower half of each slot is set to zero. Even though 8-byte loads only copy memory to half of the bits in a vector register, the entire 160-bit vector register is updated by padding the unused partitions with zeros. This feature greatly simplifies the implementation of register renaming for the MEU because partial register updates do not occur. Table 3 illustrates the load and store instructions in more detail:

TABLE 3

Load and Store Instruction Descriptions

| Instruction Type | Mnemonic Format | Description |
| --- | --- | --- |
| 16-Byte, 20-Bit Load | vldw vd, mem128 | Load destination register vd with 16 bytes of signed 16-bit data at address mem128. |
| 8-Byte, 20-Bit Load | vldw vdh, mem64 | Load slots 4 through 7 of destination register vd with 8 bytes of signed 16-bit data at address mem64. Set slots 0 through 3 of vd to zero. |
| 16-Byte, 10-Bit Load | vldb vd, mem128 | Load destination register vd with 16 bytes of unsigned 8-bit data at address mem128. Data is loaded using a 2:1 byte interleave pattern. |
| 16-Byte, 10-Bit Load | vldb vdh, mem64 | Load destination register vd with 8 bytes of unsigned 8-bit data at address mem64. The upper half of each slot receives the memory values; the lower half of each slot is set to zero. |
| 16-Byte, 20-Bit Store | vstw mem128, vs | Store source register vs to 16 bytes of signed 16-bit data at address mem128. |
| 8-Byte, 20-Bit Store | vstw mem64, vsh | Store slots 4 through 7 of source register vs to 8 bytes of signed 16-bit dat at address mem64. |
| 16-Byte, 10-Bit Store | vstb mem128, vs | Store source register vs to 16 bytes of unsigned 8-bit data at address mem128. Data is stored using a 2:1 interleave pattern. |
| 16-Byte, 10-Bit Store | vstb mem64, vsh | Store source register vs to 8 bytes of unsigned 8-bit data at address mem64. The upper half of each slot is stored to memory; the lower half of each slot is ignored. |

The mnemonics for the vector instruction need to specify the operations to perform on each partition as well as the sources, destination and ORU routing. This is notated as follows:

{sbr sbr add add sbr add sbr add} word V3, V2, V1 (37P3Z1N2)

This instruction performs adds and reverse subtracts. V3 is the destination; V2 is sourceA; V1 is sourceB. The slots for the operand specifier and the routing specifier are laid out in decreasing order from left to right.; slot 7 and 6 get sbr, slot 5 gets add, and so forth. The "word" symbol specifies that the instruction works on a 20-bit partitions. The routing specifier for sourceB is set for the following (the number after the points specify slot numbers):

dest.7<==−sourceA.7+sourceB.3
dest.6<==−sourceA.6+sourceB.7
dest.5<==sourceA.5+#1.0
dest.4<==sourceA.4+sourceB.3
dest.3<==−sourceA.3+#0.0
dest.2<==sourceA.2+sourceB.1
dest.1<==−sourceA.1+#−1.0
dest.0<==sourceA.0+sourceB.2

Figure 5:
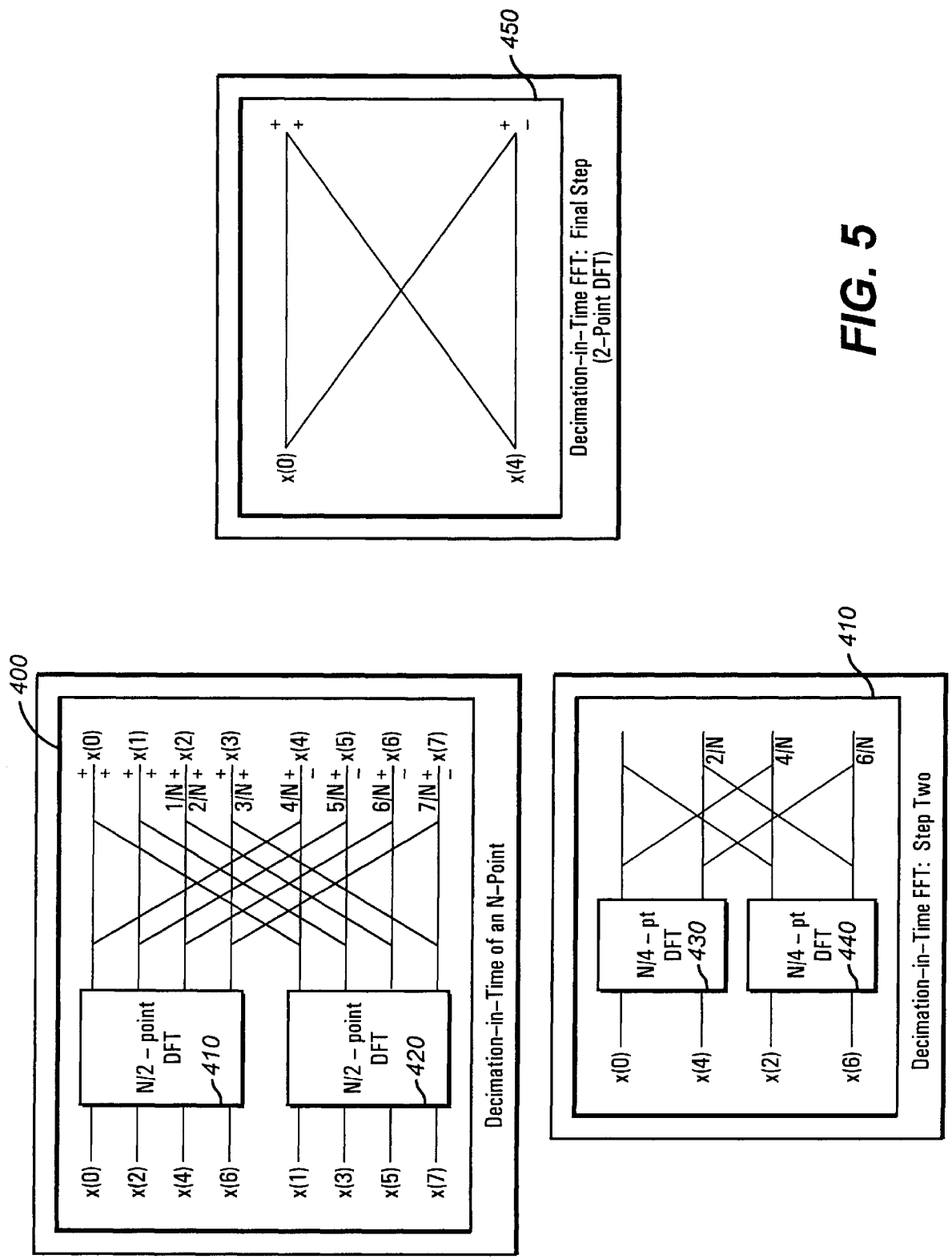
FIG. 5 is a representative flow diagram of a process for computing an 8 point DFT.

The overall decimation-in-time implementation of an n-point FFT is shown in FIG. 5. As discussed earlier, initially the N/2-point DFT's $\tilde{A}_e(k)$ and $\tilde{A}_0(k)$ are periodic in k with period N/2, and thus their values for k≧N/2 need not be recomputed, given those for 0≦k<N/2. The divide-and-conquer process is applied again and again until only a 2-point DFT remains to be computed. That is, each N/2-point DFT is computed by combining two N/4-point DFT's, each of which is computed by combining two N/8-point DFT's, and continuing on thereafter.

Referring now to FIG. 5, the process of performing two N/2-point DFTs to obtain one N-point DFT is shown. In block 400, a decimation in time FFT is performed on an N-point input. For simplicity of discussion, N equals 8, although N can be any value which is a power of two. In step 400, data inputs X0, X2, X4 and X6 are provided to a first DFT block 410 for performing the DFT operation over N/2-points. Similarly, the data inputs X1, X3, X5 and X7 are provided to a second N/2-point DFT block 420. The outputs of the N/2-point DFT block 410 are X0, X1, X2 and X3. Similarly, the outputs of the N/2-point DFT block 420 are X4, X5, X6, and X7.

The block 410 is in turn reduced into two N/4 point blocks. Thus, within the N/2-point DFT block 410 of the block 400, the inputs to the block 410 are provided to two inner N/4-point DFT blocks 430 and 440. Furthermore, the inputs to the inner blocks 430 and 440 are criss-crossed. Thus, in block 410, X0 and X4 are provided to the N/4-point DFT block 430, while X2 and X6 are provided to the N/4-point DFT block 440. Eventually, the N/4-point blocks 430 and 440 are broken down into a 2-point DFT block such as block 450. Thus, the final step in the FFT computation occurs in block 450, where X0 and X4 are processed to generate the result of the 2-point DFT. It is interesting to note the regularity of the twiddle factors $W^k$ in successive DFTs. These complex coefficients are stored in memory and read out for multiplication as required. Furthermore, although the output DFT $\tilde{A}(k)$ is in natural order, the input array $\tilde{a}(n)$ is not. This ordering of the input is known as bit-reversed order because the index sequence n in binary form and natural order becomes this sequence when the bits representing each index value are reversed. For example, in this 8-point case, the natural order 000, 001, 010, 011, 100, 101, 111 becomes 000, 100, 010, 110, 001, 101, 011, 111, or 0, 4, 2, 6, 1, 5, 3, and 7.

Figure 6:
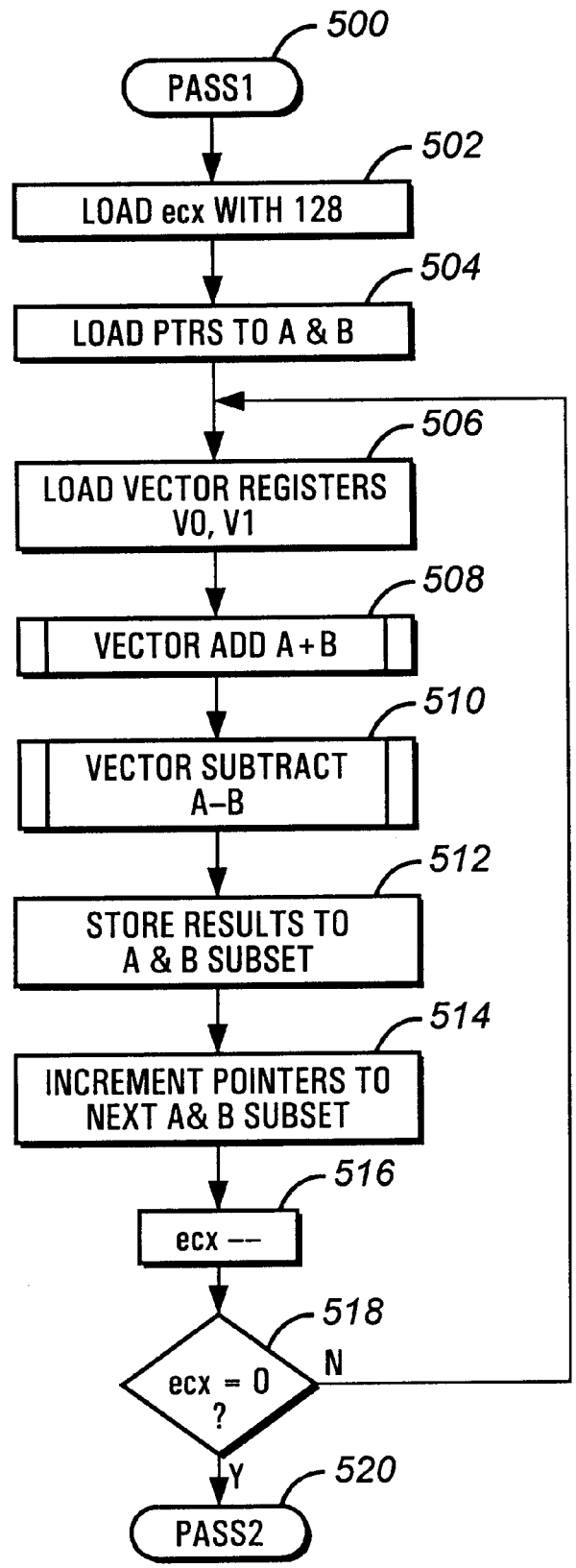
FIG. 6 is a flow chart of a process for performing the first pass of the FFT computation.

FIGS. 6–18 illustrate in more detail the FFT acceleration engine of the present invention. Because a 1024 point FFT is implemented in the present invention, the 1024-point DFT is in turn reduced into 10 sub blocks, for $2^{10}$=1024. Each block is represented as a "Pass" in the present invention. Turning first to FIG. 6, a first pass of the FFT computation process is shown. The Pass__1 routine of FIG. 6 is special in that the twiddle factor is constant. In FIG. 6, the computation for AR, AI, BR, and BI is shown. AR represents the real component of the A vector, AI represents the imaginary component of the A vector, BR represents the real component of the B vector and BI represents the imaginary component of the B vector. The first pass of FIG. 6 performs the computation for AR, AI, BR, and BI as follows:

Ar=Ar+Br
Ai=Ai+Bi
Br=Ar−Br
Bi=Ai−Bi

From step 500 of FIG. 6, the routine loads a counter called exc with 128 in step 502. Furthermore, it loads pointers to input vector or array A and B in step 504. It is to be noted that, for both A and B vectors, real data components are stored on even word boundaries, while imaginary data components are stored on the odd word boundaries.

From step 504, the routine proceeds to step 506 where it loads the vector registers V0 and V1 with the respective A and B data values. Next, in step 508, the routine performs a vector addition for both the real and imaginary components of A in step 508. Furthermore, in step 510, the routine performs a vector subtraction for both the real and imaginary components of the B array in accordance with the above equations.

From step 510, the routine stores the results of the vector operations in the respective memory locations for A and B. Next, the routine increments the pointer to point to the next A and B data components. In step 516, the routine decrements the counter ecx. It then checks if the counter has reached zero in step 518. If not, the routine loops back to step 506 to continue the processing of the real and imaginary components of A and B array. Alternatively, in the event that the counter has reached zero, the routine proceeds to Pass__2 in step 520. The code for executing Pass__1 on the MEU of the present invention is presented in Table 4.

TABLE 4

```
    mov    ecx,    128              ;Set up counter
    mov    edi,    dataPtr          ;Point to A
    mov    esi,    dataPtr = 512*4  ;Point to B
Pass__1:
    vld    v0l,    [edi]
    vld    v0h,    [edi+8]
    vld    v1l,    [esi]
    vld    v1h,    [esi+8]
    {add add add add add add add add} v2, v0, v1(76543210)
    {sub sub sub sub sub sub sub sub} v1, v0, v1(76543210)
    vst    [edi], v2l
    vst    [edi+8], v2h
    vst    [esi], v1l
    vst    [esi+8], v1h
    add    esi,    16
    add    edi,    16
    dec    ecx
    jnz    Pass__1
```

Figure 7:
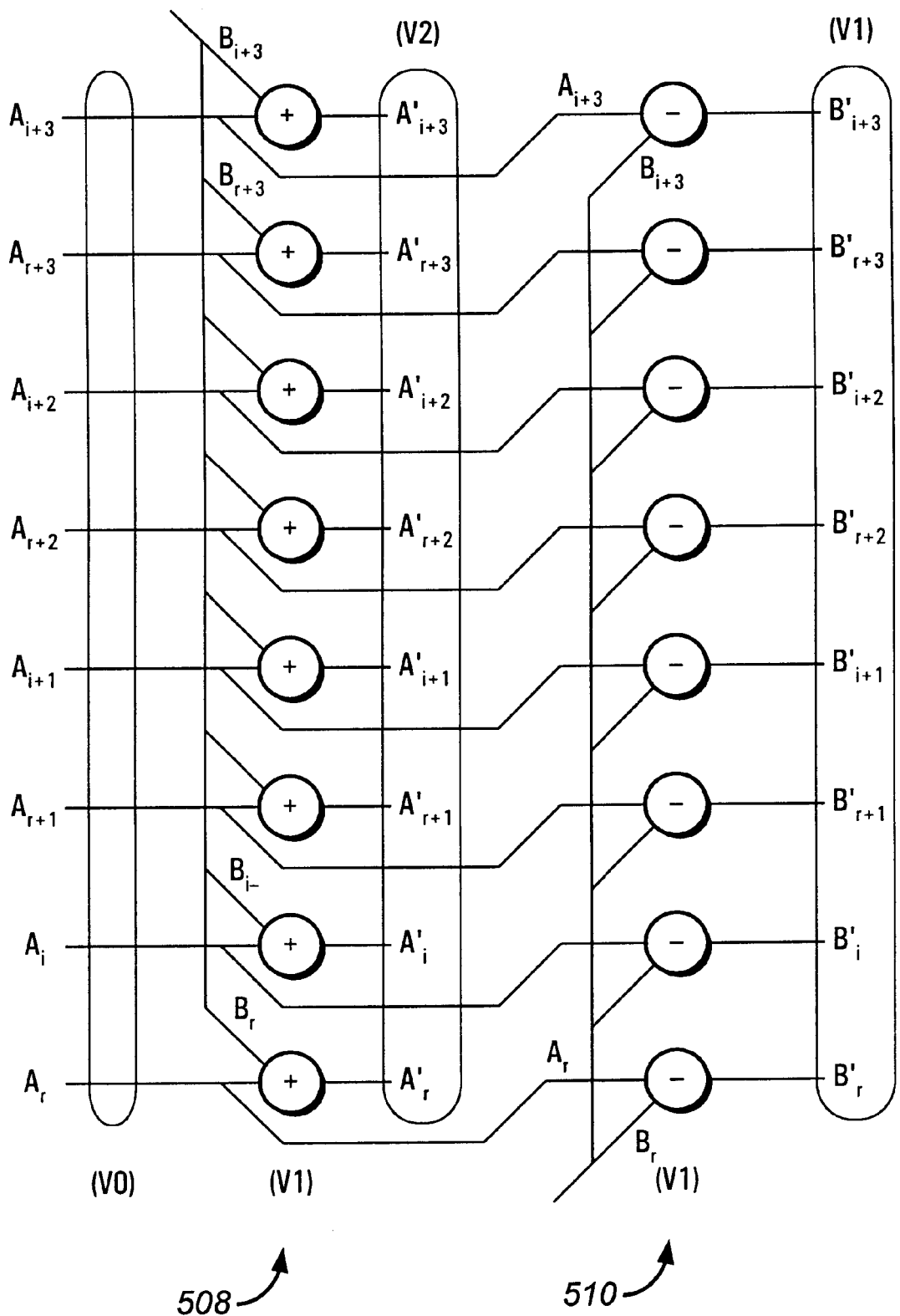
FIG. 7 is a flow diagram of vector operations performed in FIG. 6.

Referring now to FIG. 7, the vector operations of steps 508 and step 510 are shown in more detail. Before entering step 508, the respective data values $A_{i+3}$, $A_{r+3}$, $A_{i+2}$, $A_{r+2}$, $A_{i+1}$, $A_{r+1}$, $A_i$ and $A_r$ have already been loaded into the vector register V0. Similarly, B1 has already been loaded with $B_{i+3}$, $B_{r+3}$, $B_{i+2}$, $B_{r+2}$, $B_{i+1}$, $B_{r+1}$, $B_i$ and $B_r$. In step 508, a vector add operation performed on the contents of vector registers V0 and V1 while the result of the vector operation is stored in vector register V2. Thus, in a single clock, vector register V2 stores the new values $A'_{i+3}$, $A'_{r+3}$, $A'_{i+2}$, $A'_{r+2}$, $A'_{i+1}$, $A'_{r+1}$, $A'_i$ and $A'_r$.

Figure 8:
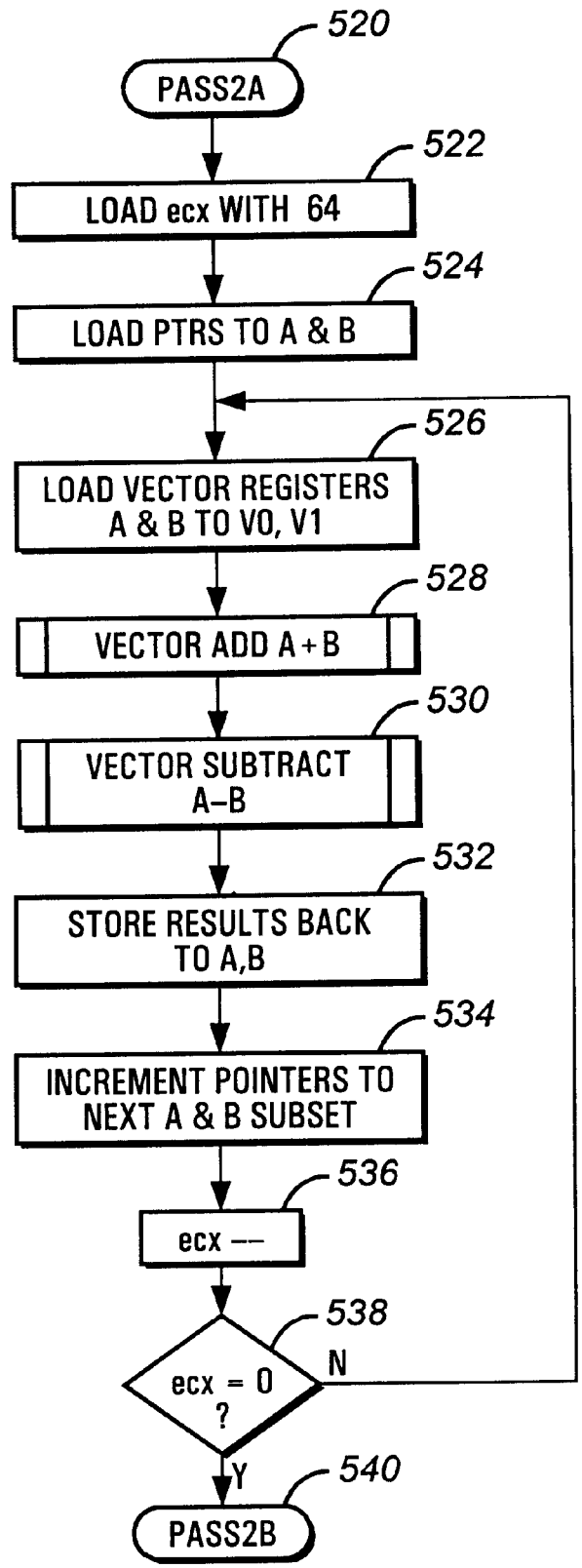
FIG. 8 is a flow chart of a second FFT pass.

Next, as shown in FIG. 7, in step 510, a vector subtraction of the contents of the vector registers V1 from the contents of the vector register V0 is performed. Thus, in one step, the vector register V1 houses new values $B'_{i+3}$, $B'_{r+3}$, $B'_{i+2}$, $B'_{r+2}$, $B'_{i+1}$, $B'_{r+1}$, $B'_i$ and $B'_r$. As shown FIG. 7, the ability to perform vector operations on eight data values at once illustrates the significant performance gain achieved with an MEU. Referring now to FIG. 8, after pass one Pass__1 of FIG. 6 has been completed, the routine proceeds to Pass__2A in step 520 of FIG. 8. Pass__2A performs the computation for AR, AI, BR, and BI as follows:

Ar=Ar+Br
Ai=Ai+Bi
Br=Ar−Br
Bi=Ai−Bi

From step 520, the routine loads the counter ecx with a value of 64 in step 522 to signify that 64 computations of the inner loop of FIG. 8 are to be performed. Next, the routine loads the data pointers to the respective A and B data arrays in step 524.

From step 524, the routine loads the vector registers V0 and V1 with a sub-portion of the data of A and B arrays, as pointed to by the pointers of step 524. Next, in step 528, a vector addition operation is performed. This operation computes the real and the imaginary components of A. From step 528, the routine then subtracts A−B in step 530. The operation in step 530 computes the real and imaginary components of the B array. From step 530, the routine stores the results of steps 528–530 back into the memory locations for A and B in step 532. Next, it increments the pointers to the next subset of A and B arrays in step 534. From step 534, the routine decrements the counter ecx in step 536. It then checks to see if the counter has reached zero in step 538. If not, the routine loops back to step 526 to continue the generation of the real and imaginary components of the respective arrays A and B.

In step 538, in the event that 64 iterations have been done, the routine continues to the next pass Pass__2B in step 540. Pass__2B is illustrated in more detail in FIG. 10. The code to perform Pass__2A is illustrated in Table 5.

TABLE 5

```
    mov    ecx,    64                ;Set up for 64 iterations
    mov    edi,    dataPtr           ;Point to A
    mov    esi,    dataPtr + 256*4   ;Point to B
Pass__2A:
    vld    v0l,    [edi]
    vld    v0h,    [edi+8]
    vld    v1l,    [esi]
    vld    v1h,    [esi+8]
    {add add add add add add add add} v2, v0, v1(76543210)
    (sub sub sub sub sub sub sub sub} v1, v0, v1(76543210)
    vst    [edi], v2l
    vst    [edi+8], v2h
    vst    [esi], v1l
    vst    [esi+8] v1h
    add    esi,    16
    add    edi,    16
    dec    ecx
    jnz    Pass__2A
```

Figure 9:
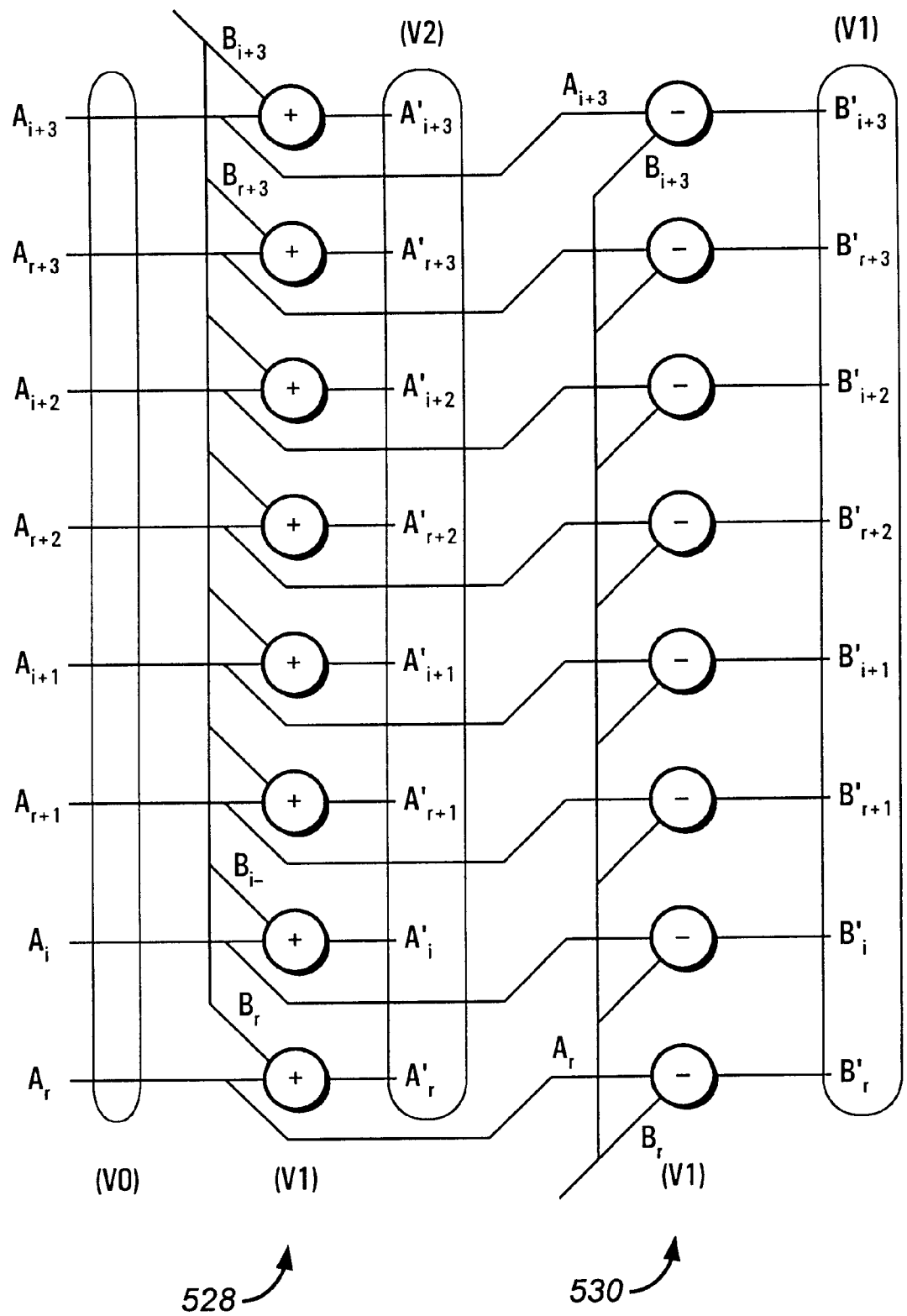
FIG. 9 is a flow diagram illustrating in more detail the vector operation performed in the process of FIG. 8.

Turning now to FIG. 9, the vector computation for steps 528 and 530 are shown in more detail. Before entering step 528, the respective data values $A_{i+3}$, $A_{r+3}$, $_{Ai+2}$, $A_{r+2}$, $A_{i+1}$, $A_{r+1}$, $A_i$ and $A_r$ have already been loaded into the vector register V0. Similarly, B1 has already been loaded with $B_{i+3}$, $B_{r+3}$, $B_{i+2}$, $B_{r+2}$, $B_{i+1}$, $B_{r+1}$, $B_i$ and $B_r$. In step 528, a vector add operation is performed on the contents of vector registers V0 and V1 while the result of the vector operation is stored in vector register V2. Thus, in a single clock, vector register V2 stores the new values $A_{i+3}$, $A_{r+3}$, $A'_{i+2}$, $A'_{r+2}$, $A'_{i+1}$, $A'_{r+1}$, $A'_i$ and $A'_r$.

Next, as shown in FIG. 9, in step 530, a vector subtraction of the contents of the vector registers V1 from the contents of the vector register V0 is performed. Thus, in one step, the vector register V1 houses new values $B'_{i+3}$, $B'_{r+3}$, $B'_{i+2}$, $B'_{r+2}$, $B'_{r+1}$, $B'_{r+1}$, $B'_i$ and $B'_r$. As shown in FIG. 9, the ability to perform vector operations on eight data values at once illustrates the significant speedup achieved with the MEU of the present invention.

Figure 10:
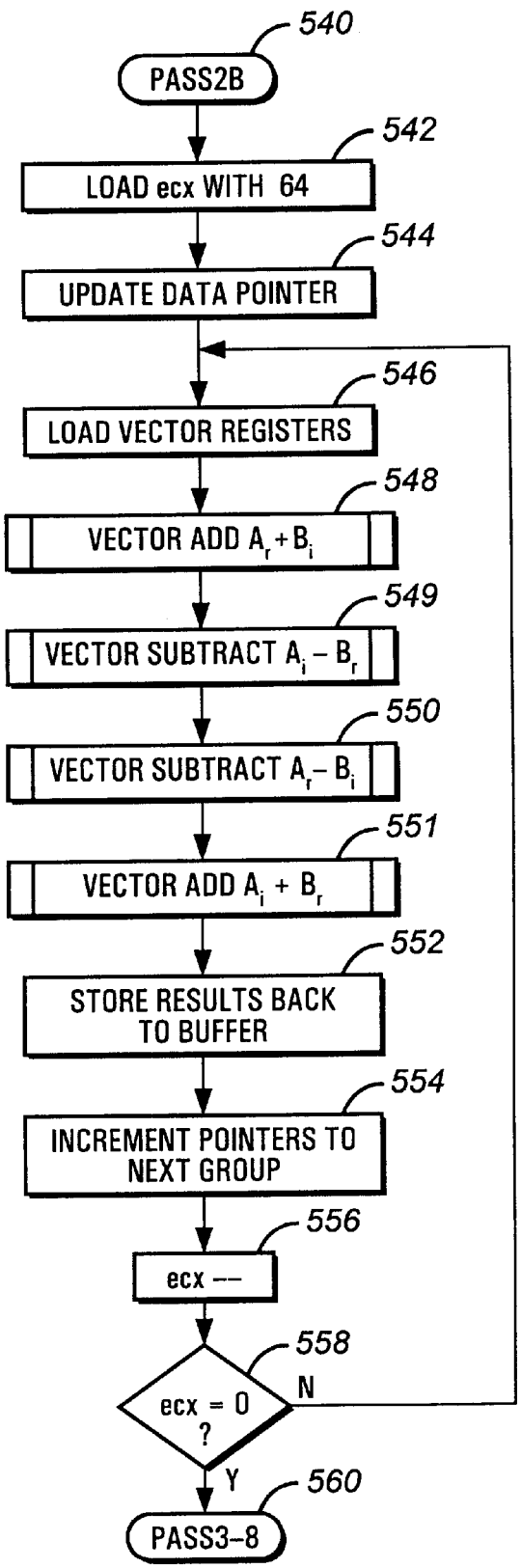
FIG. 10 is a flow chart of a continuation of the pass of FIG. 8.

Turning now to FIG. 10, the continuation of the FFT processing from FIG. 8 is shown in more detail. In FIG. 10, from step 540, the routine loads the counter ecx with a value of 64 in step 542. Furthermore, it updates the respective data pointers to the arrays A and B in step 544. From step 544, the routine loads the vector registers V0 and V1 in step 546. Next, the following computations are performed:

Ar=Ar+Bi

Ai=Ai−Br

Br=Ar−Bi

Bi=Ai+Br

Thus, from step 546, the routine computes a new value of the real component of the A vector by adding the real component of the A with the imaginary component of the B vector in step 548. Furthermore, the routine computes the imaginary component of the A array by subtracting the real component of the B array from the imaginary component of the A array in step 549. From step 549, the routine continues to step 550 where it computes the real component of the B array by subtracting the imaginary component of the B array from the real component of the A array. Furthermore, it computes the imaginary component of the B array by adding the imaginary component of the A array to the real component of the B array in step 551. From step 551, the routine stores the results on the real and imaginary components of the A and B arrays in step 552. Next, it increments the pointers to point to the next portion of the arrays A and B to be processed in step 554. From step 554, the routine decrements the ecx counter in step 556. Next it checks if the ecx counter is zero in step 558. If not, the routine loops back to step 546 to continue processing until 64 iterations of steps 546 through steps 556 have been performed. Once the ecx counter reaches zero in step 558, the routine continues to process passes 3 through 8, as illustrated in detail in FIG. 12. The code for performing Pass_2B is shown in Table 6.

TABLE 6

```
    mov     ecx, 64
    add     edi, 256*4
    add     esi, 256*4
Pass_ 2B:
    vld     v01,    [edi]
    vld     v0h,    [edi+8]
    vld     v11,    [esi]
    vld     v1h,    [esi+8]
    {sub add sub add sub add sub add} v2, v0, v1 (67452301)
    {add sub add sub add sub add sub} v1, v0, V1 (67452301)
    vst     [edi], v21
    vst     [edi+8], v2h
    vst     [esi], v11
    vst     [esi+8], v1h
    add     esi,    16
    add     edi,    16
    dec     ecx
    jnz     Pass_ 2B
```

Figure 11:
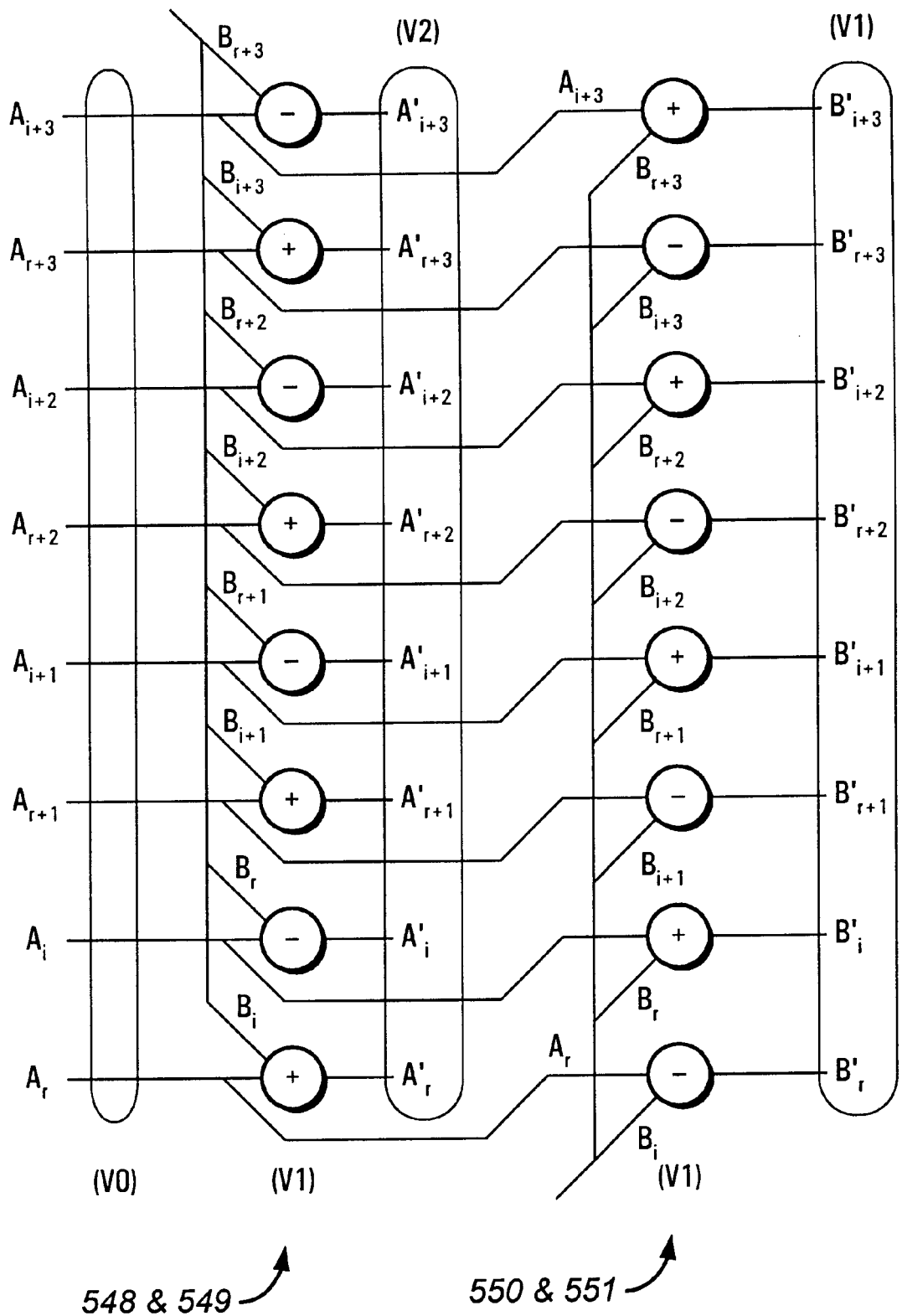
FIG. 11 is a flow diagram illustrating the vector operations performed in the process of FIG. 10.

Turning now to FIG. 11, the vector operations of steps 548, 549, 550 and 551 are shown in detail. Steps 548 and 549 in combination illustrate the increased efficiency of calculating multiple operations on different data stored in routed slots of the vector registers. Prior to steps 548 and 549, the respective components of the A array and the B array are loaded into the vector registers V0 and V1. Thus, V0 contains $A_{i+3}$, $A_{r+3}$, $A_{i+2}$, $A_{r+2}$, $A_{i+1}$, $A_{r+1}$, $A_i$ and $A_r$. Similarly, the vector register V1 contains $B_{r+3}$, $B_{i+3}$, $B_{r+2}$, $B_{i+2}$, $B_{r+1}$, $B_{i+1}$, $B_r$, and $B_i$. In steps 548 and 549, the real and imaginary values of the A array are computed in a single step. The real component for A is arrived at by adding the real component of the A array to the imaginary component of the B array. Furthermore, the imaginary component of the A array is computed by subtracting the real component of the B array from the imaginary component of the A array.

The ability of the MEU to perform multiple operations on multiple data values is further utilized advantageously in steps 548 and 549 of FIG. 11, where simultaneous subtractions and additions are performed on respective slots of the vector register V0, V1 and V2. Turning now to step 548 and 549 of FIG. 11, after the simultaneous addition and subtraction operation, the results are deposited into respective slots of the vector register V2. The first slot of vector V2 contains $A'_r$ which is equal to the value of $A_r+B_i$. The first slot of the vector register V2 contains $A'_i$, which is arrived at by subtracting $B_r$ from $A_i$. This process is repeated for the respective components of A and B. Thus, the second slot of the vector register V2 contains $A'_{r+1}$, which is arrived at by adding $B_{i+1}$ to $A_{r+1}$. Next, the third slot of V2 contains $A'_{i+1}$ which equals $A_{i+1}-B_{r+1}$. The fourth slot of the vector V2 contains $A'_{r+2}$ which contains the results of adding $A_{r+2}$ to $B_{i+2}$. Furthermore, the fifth slot of the vector register V2 contains $A'_{i+2}$, which equals $A_{i+2}-B_{r+1}$. Similarly, the sixth and seventh slots of the vector register V2 contains $A'_{r+3}$ and $A'_{i+3}$, arrived at by adding $A_{r+3}$ to $B_{i+3}$ and subtracting $B_{i+3}$ from $A_{i+3}$.

Next, as the vector registers V0 and V1 already contain the appropriate components of A and B array, a similar operation is performed to compute the values for the real and imaginary components of the B array. Thus, for each real component of the B array, the imaginary component of B is subtracted from the real component of the A array. Furthermore, for each imaginary component of the B array, the values of the imaginary component of the A array is added with the real value of the B array. In this manner, the vector register V1 contains the values of $B'_{i+3}$, $B'_{r+3}$, $B'_{i+2}$, $B'_{r+2}$, $B'_{i+1}$, $B'_{r+1}$, $B'_i$ and $B'_r$. Thus, in this manner, in each 548 and 549, 550 and 551, simultaneous additions and subtractions are performed to arrive at the respective values of the real and imaginary components of the data array A and B.

Figure 12:
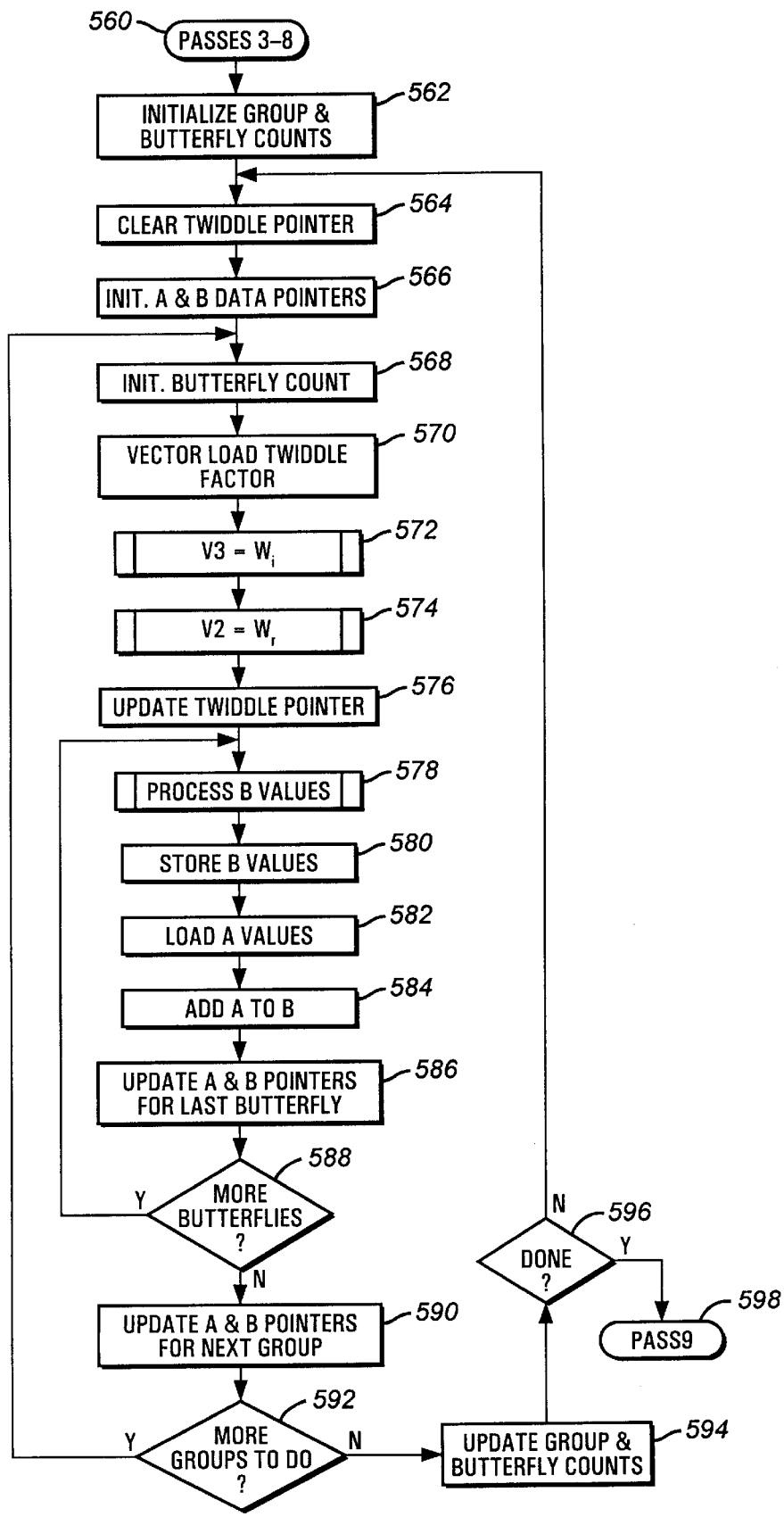
FIG. 12 is a flow chart illustrating passes 3 through 8 which continues from FIG. 10.

Turning now to FIG. 12, the continuation of the FFT processing from the flow chart of FIG. 10 is shown. In FIG. 12, each pass in the passes 3–8 is shown in detail. The equations implemented in each of the passes 3–8 are:

Ar=Ar+Xr;

Ar=Ar+Xr;

Br=Ar−Xr;

Bi=Ai−Xi;

where

Xr=Wr*Br+Wi*Bi;

Xi=Wr*Bi−Wi*Br;

FIG. 12 implements passes 3–8. In FIG. 12, from step 560, the routine initializes a group and butterfly counters in step 562. Next, in step 564, the routine initializes the pointers to the twiddle data storage array in step 564. Next, the routine initializes the pointers to the respective A and B data array in step 566.

From step 566, the routine initializes the butterfly count in step 568. From step 568, the routine loads twiddle factors into the vector register V2 in step 570. Next, the routine loads the imaginary component Wi of the twiddle factor W into the vector register V3 in step 572. Similarly, the real component Wr of the twiddle vector W is loaded into the vector register V2 in step 574. From step 574, the twiddle pointer is updated in step 576.

From step 576, the routine proceeds to step 578 where it computes the real and imaginary data updates to the B array. From step 578, the routine proceeds to step 580 where the resulting values for the B components are saved into memory. Next, the routine proceeds to step 582 where it loads the values of the A array into the vector register V1. In step 584, the routine adds the results of A to B in step 584. From step 584, the routine updates the pointers to the A and B array for the next butterfly operation in step 586. From step 586, the routine checks if additional butterfly operations need to be performed in step 588. If so, the routine loops back to step 578 to continue processing the butterfly portion.

From step 588, in the event that the routine of FIG. 12 has completed the processing of the current butterfly group, the routine updates the pointers for A and B arrays in preparation for the next group computation in step 590. From step 590, the routine checks to see if additional groups need to be processed in step 592. If so, the routine loops back to step 568 to continue processing the next group. Alternatively, from step 592, in the event that all groups have been processed, the routine proceeds to step 594 where it updates the group and butterfly counts.

From step 594, the routine checks to see if it has completed processing for all data with respect to passes 3 through 8 in step 596. If not, the routine loops back to step 564 to continue processing. Alternatively, the routine proceeds to step 598 where it continues the FFT processing in pass 9.

The code for implementing passes 3–8 on the MEU is illustrated in Table 7:

TABLE 7

```
          mov     eax, 4          ;init group and bfly counts
          mov     ebx, 128
          mov     nGroups, eax
          mov     nBflys, ebx
nextPass:
          mov     edx, 0          ;init twiddle pointer
          mov     edi, dataPtr    ;init A and B data pointers
          mov     ecx, ebx
          shl     ecx, 2
          add     esi, ecx
nextGroup:
          mov     ecx, ebx        ;init bfly count
          shr     ecx, 2
          vld     v21, [edx]      ;load twiddle factor (may be misaligned)
          {neg mov neg mov neg mov neg mov} word v3, v2, v2 (11111111); v3=Wi
          {mov mov mov mov mov mov mov mov} word v2, v2, v2 (00000000); v2=Wr
          add     edx, 4          ;update twiddle pointer
nextBfly;
          vld     vll,    [esi]   ;load B values
          vld     vlh,    [esi+8]
          {mul mul mul mul mul mul mul mul}        word v0, v2, v1 (76543210)
          {mac mac mac mac mac mac mac mac}        word v0, v3, v1 (67452301)
          {sub sub sub sub sub sub sub sub}        word v1, v1, v0 (76543210)
          vst     [esi], v11      ;store B values
          vst     [esi+8], v1h
          vld     v11,    [edi]   ;load A values
          vld     v1h,    [edi+8]
          {add add add add add add add add}  word v1, v1, v0 (76543210)
          vst     [edi], v11      ;store A values
          vst     [edi+8], v1h
          add     edi, 16         ;update A and B pointers for next butterfly
          add     esi, 16
          dec     ecx             ;test if more bflys to do
          jnz     nextBfly
          mov     ecx, ebx        ;update A and B pointers for next group
          shl     ecx, 2
          add     edi, ecx
          add     esi, ecx
          dec     eax             ;text if more groups to do
          jnz     nextGroup
          mov     eax, nGroups    ;update group and butterfly counts
          mov     ebx, nBflys
          shl     eax, 1
          shl     ebx, 1
          mov     nGroups, eax
          mov     nBflys, ebx
          cmp     nBflys, 4
          jge     nextPass
```

Figure 13:
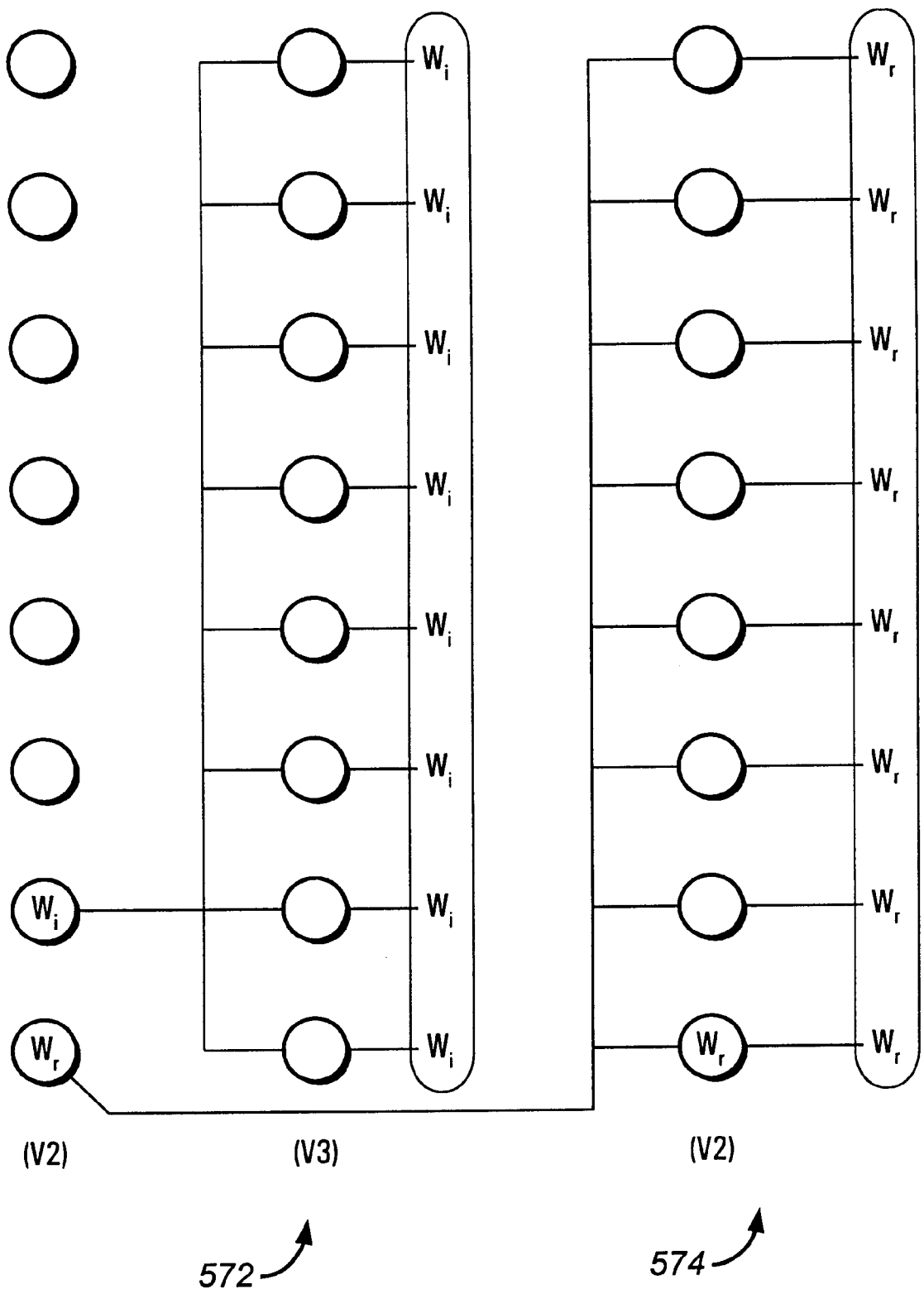
FIG. 13 is a flow chart of twiddle coefficient copying performed in the process of FIG. 12.

Turning now to FIG. 13, the vector copy operations for copying the real and imaginary components of the twiddle vector into registers V3 and V2 in steps 572 and 574 are illustrated. In FIG. 13, in one operation, the imaginary twiddle component stored in the vector register V2 is copied to all eight slots of vector register V3 in step 572. Similarly, the real component stored in the vector register V2 is copied in one step to all eight slots of the vector register V2 in step 574. Thus, at the conclusion of step 574, vector register V3 contains identical values of imaginary components of the twiddle factor. Similarly, vector register V2 contains identical copies of the real value for the twiddle factor.

Figure 14:
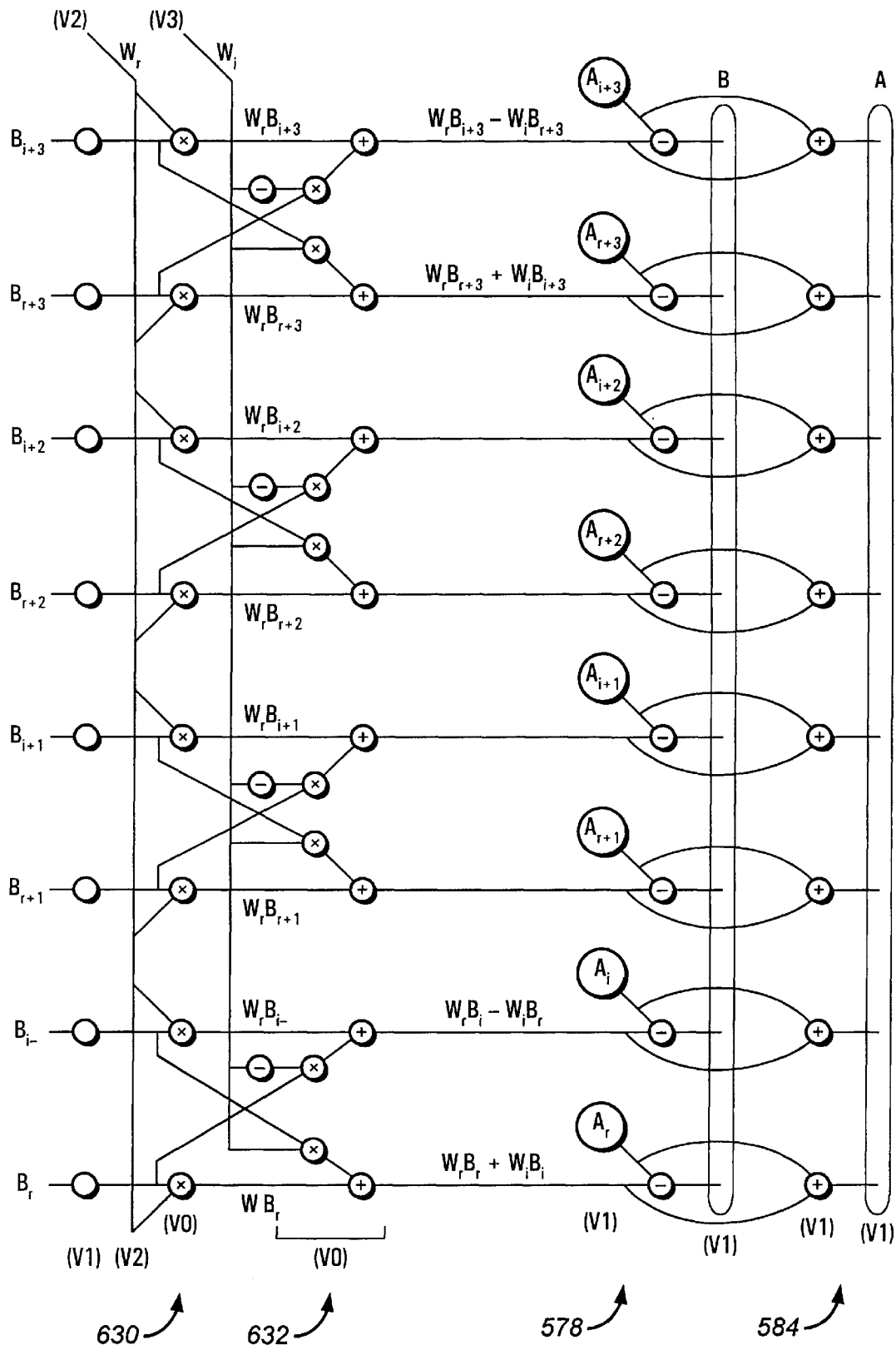
FIG. 14 is a flow diagram illustrating the computation of A and B in the process of FIG. 12.

Turning now to FIG. 14, the vector operations to compute the real and imaginary components of the A and B arrays are shown. The vector operations of FIG. 14 perform the following calculation:

Ar=Ar+Xr

Ai=Ai+Xi

Br=Ar−Xr

Bi=Ai−Xi where: Xr=Wr×Br+Wi×Bi

Xi=Wr×Bi−Wi×Br

Before step 630, the respective values of V1 and V2 have been loaded. V1 contains $B_{i+3}$, $B_{r+3}$, $B_{i+2}$, $B_{r+2}$, $B_{i+1}$, $B_{r+1}$, $B_i$, and $B_r$, while the vector register V2 contains the real component of the twiddle factor Wr. In step 630, a multiply operation is performed between V1 and V2. The result is stored in vector register V0. Thus, at the end of instruction 630, vector register V0 contains $WrB_{i+3}$, $WrB_{r+3}$, $WrB_{i+2}$, $WrB_{r+2}$, $WrB_{i+1}$, $WrB_{r+1}$, $WrB_i$ and $WrB_r$.

Next, in step 632, a vector multiply accumulate operation, with alternating positive and negative accumulation via MAC and MAC plus NEG instructions is performed. In step 632, as the operations of slots 0 and 1 are representative of operations on slots 2, 3, 4, 5, 6 and 7, the operations performed on slots 0 and 1 of vector register V0 are focused on in detail. In step 632, the first slot of V1 which contains Br is multiplied with the first slot of the vector register V3 which contains the imaginary twiddle component. The result is cumulatively added to the current value in the first slot of the vector register V0 to arrive at WrBr+WiBi. Similarly, the second slot of V1 or $B_i$ is multiplied and negatively accumulated with the second slot of vector register V0 which contains WrBi to arrive at WrBi−WrBr. Thus, at the end of vector instruction 632, the first and second slots of the vector register V0 contain WrBr+WiBi and WrBi−WiBr respectively. The pair of operation is repeated four more times on the remaining slots of the vector registers V0, V1 and V2, advantageously employing the vector capability of the MEU according to the invention.

Next, the upper and lower words of the vector register V1 are pre-loaded with data from the A array such that the vector register V1 contains $A_{i+3}$, $A_{r+3}$, $A_{i+2}$, $A_{r+2}$, $A_{i+1}$, $A_{r+1}$, $A_i$ and $A_r$. In step 578, a vector subtract operation is performed between V1 and V0 to arrived at the desired real and imaginary results for the B array. After step 578, the real and imaginary components of the A array are computed via a vector addition in accordance with the above equations. Similar to step 578, in step 584, $A_{i+3}$. . $A_r$ stored in slots 7 . . 0 of the vector register V1 is added to vector register V0 to arrive at the real and imaginary values for the A array. The results for the A and B arrays are eventually saved before the iterations of FIG. 12 are continued.

Figure 15:
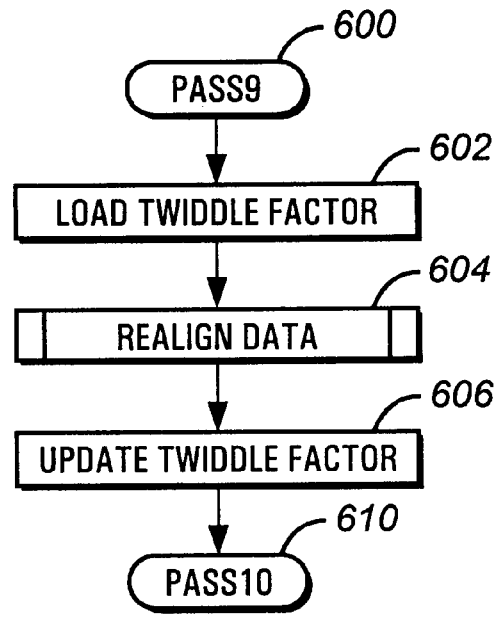
FIG. 15 is a flow chart illustrating twiddle coefficient realignment in pass 9.

Turning now to FIG. 15, the operation of a twiddle factor adjustment code in pass 9 is shown in more detail. The process to realign the twiddle factor for pass 9 starts from step 600. The routine loads the real and imaginary components of the twiddle factor in step 602. Next, a vector realignment is performed in step 604. From step 604, the routine updates the twiddle factor pointer in step 608 before it proceeds with the rest of pass 9 in step 610. In other respects, the processing of pass 9 is similar to that of FIG. 12 and thus these steps are not discussed further.

Figure 16:
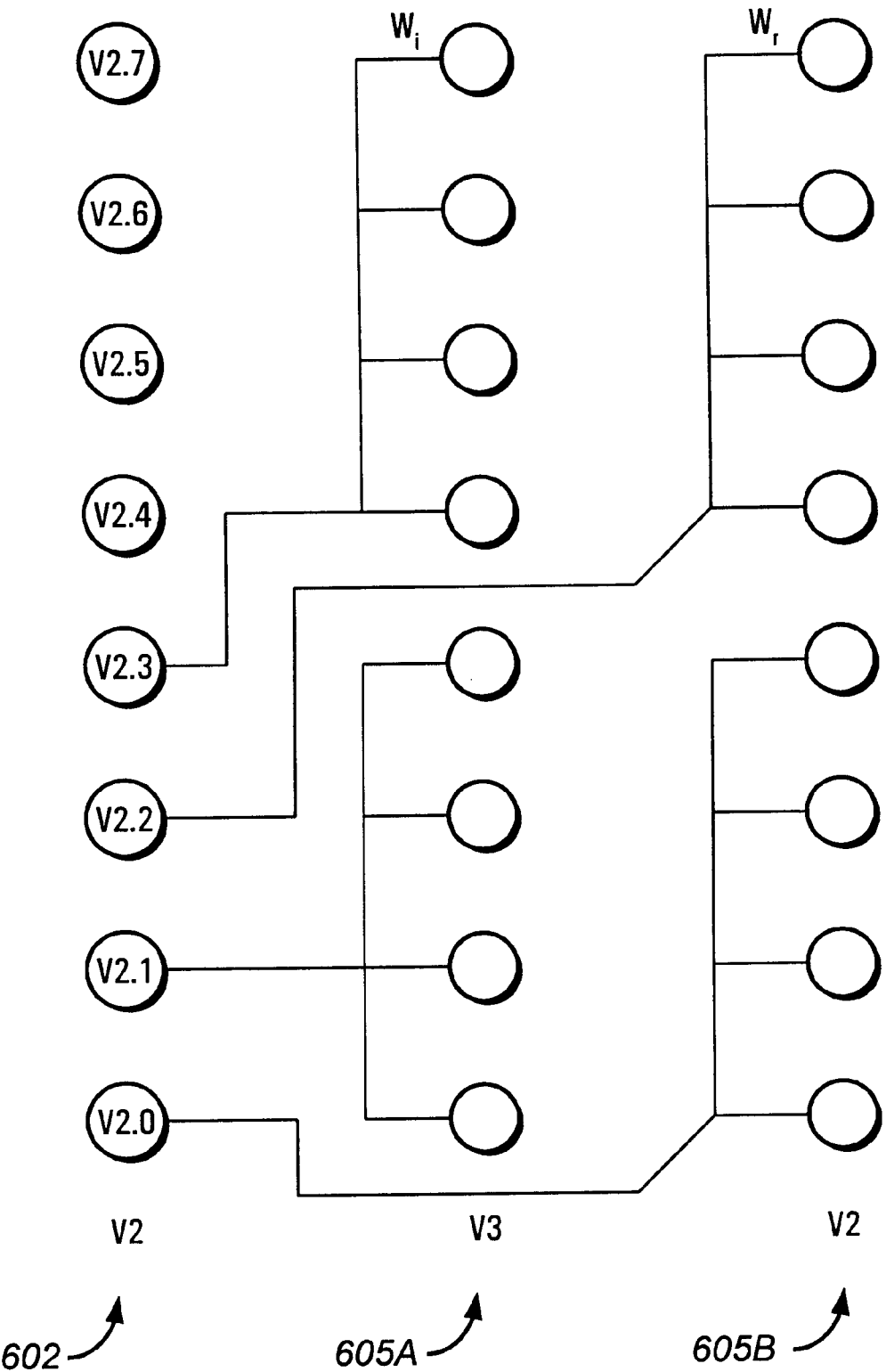
FIG. 16 is a flow diagram of the twiddle coefficient realignment operation of FIG. 15.

The code for performing the twiddle factor realignment of pass 9 is shown below:

vld v21, [edx]; load twiddle factor (may be misaligned) {neg mov neg mov neg mov neg mov} word v3, v2, v2 (33331111); v3=Wi {mov mov mov mov mov mov mov mov} word v2, v2, v2 (22220000), v2=Wr add edx, 8; update twiddle pointer Referring now to FIG. 16, the twiddle factor realignment process is shown. In FIG. 16, at step 602, the vector register V2 contains both the real and imaginary components of the twiddle factor. Next, in step 605A, the routine copies the first and second imaginary portions of the twiddle factor to the upper portion and the lower portion of the vector register V3 respectively. Similarly, in step 605B, the real components of the twiddle factor are copied into the upper and lower portions of the vector register V2. Thus, the code of FIG. 15 illustrates the power of the vector copy instruction of the MEU of the present invention, where 16 words are copied in two operations.

Figure 17:
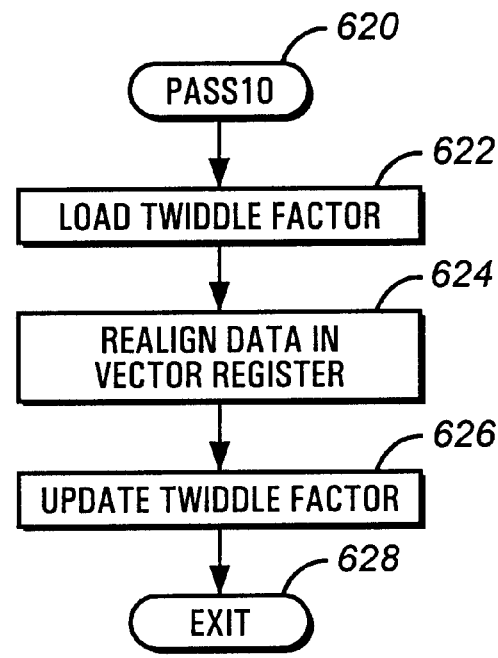
FIG. 17 is a flow chart illustrating twiddle coefficient realignment in pass 10.
Figure 18:
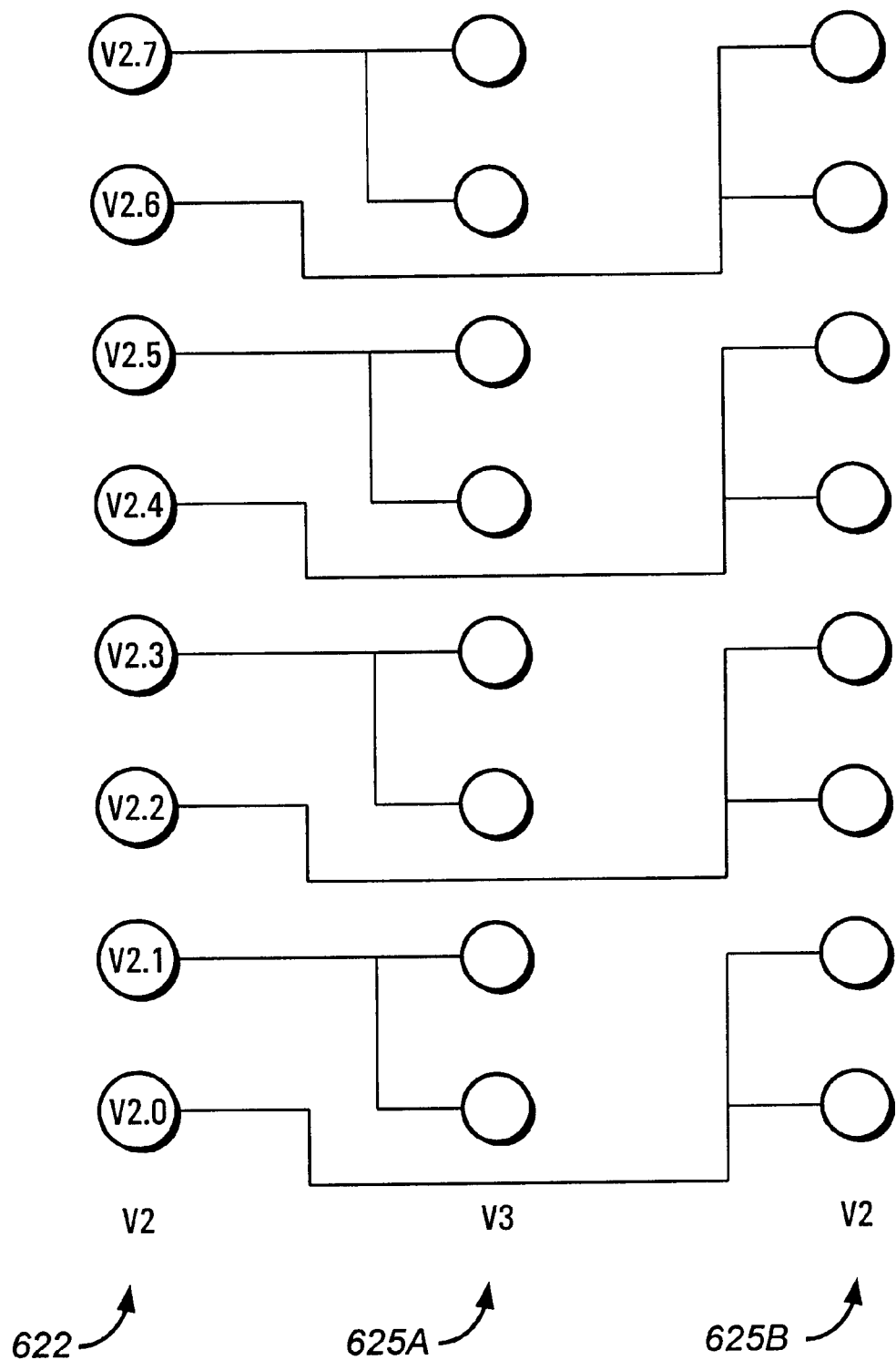
FIG. 18 is a flow diagram of the vector operations to copy the twiddle coefficient in FIG. 17.

Turning now to FIG. 17, the process for adjusting the twiddle factor for pass 10 is shown in detail. In FIG. 17, from step 620, the routine loads the twiddle factors in step 622 and proceeds to realign the data in the vector registers V2 and V3 in step 624. Next, it updates the twiddle factor pointer in step 626 before the routine of FIG. 17 exits in step 628. The code for performing the steps of FIG. 17 is:

vld v21, [edx]; load twiddle factor (may be misaligned) {neg mov neg mov neg mov neg mov} word v3, v2, v2 (77553311); v3=Wi {mov mov mov mov mov mov mov mov} word v2, v2, v2 (66442200), v2=Wr add edx, 16; update twiddle pointer Turning now to FIG. 18, the flow diagram illustrating the process of copying and adjusting the twiddle factor is shown in more detail. In step 622, the vector register V2 contains both the real and imaginary components of the twiddle factor. In step 625A, the imaginary components of four twiddle factors are copied into four respective pairs in the vector register V3. Similarly, in step 625B, pairs of the real components of the twiddle factor are copied into four respective pairs of slots in the vector register V2. After this step has been performed, computations similar to that of FIG. 12 is performed and need not be discussed in detail here.

The FFT process performed by the present invention thus reduces the complexity from a $N^2$ order of complex multiplications and additions in the case of a DFT to a $\log_2 N$ order complexity, each of which requires up to N complex multiplications by twiddle factors and N complex additions. An important aspect of the FFT algorithm is that it can be computed in place in memory. That is, if the input array $\tilde{a}(n)$ is not needed in other processing, it can be overwritten with intermediate results of successive stages until it finally contains the DFT $\tilde{A}(k)$. Hence, except for a few working registers, no additional memory is required.

Thus, the present invention provides a fast, high precision Fourier transform to satisfy the increased demand for communication, multimedia, image de-blurring in CAT scans and MRIs, seismic exploration, multimedia applications, power spectrum estimation, radar signal processing, and other consumer products such as speech recognition, speaker verification, credit card fraud protection, among others. For example, synthetic aperture radar applications (SAR) initially process return signals using integer fast filtering and convolution operators to extract range information, and then perform floating point operations, such as, FFTs and linear algebra operate to produce low clutter, higher resolution images. Similarly, CT scanners pre-process sensor data in fixed point, while final processing, including image averaging, two dimensional FFTs, and Hough transforms, is most efficiently performed on parallel floating point processors.

Additionally, FFTs are used in power spectrum estimation, which is a technique for measuring the power in the noisy signal as a function of frequency. Power spectrum estimators are used in image deblurring software in deconvolving the real signal from the distortions of the measurement system. Other power spectrum estimation applications occur in the analysis of geophysical data in oil, and other mineral exploration, linear predictive coating models for speech synthesis and compression, and sonar signal processing. Thus, the MEU and the code of the present invention breathe life to FFT processing technology because its implementation had been impractical in the past.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for performing a N-point Fast Fourier Transform (FFT) on first and second arrays having real and imaginary input values using a processor with a vector processor having operand routing and slot selectable operation, wherein N is a power of two, said method comprising the steps of:

(a) repetitively sub-dividing a N-point Discrete Fourier Transform into N/2-point Discrete Fourier Transforms until only a plurality of 2-point Discrete Fourier Transforms remain;

(b) simultaneously vector processing at least two of the 2-point Discrete Fourier Transforms using the vector processor; and (c) simultaneously cumulating the results of at least two of the 2-point Discrete Fourier Transforms from each of the sub-divided N/2-point Discrete Fourier Transforms to generate the result of said N-point Discrete Fourier Transform.

2. The method of claim 1, wherein step (b) further comprises the steps of:

(d) loading a plurality of input values from said first array into a first vector register and input values from said second array into a second vector register;

(e) vector adding said second vector register to said first vector register;

(f) vector subtracting said second vector register from said first vector register; and (g) repeating steps (d) through (f) until said all input values in said first and second arrays have been processed.

3. The method of claim 1, wherein step (b) further comprises the steps of:

(h) loading a plurality of input values from said first array into a first vector register and input values from said second array into a second vector register;

(i) vector adding the imaginary input values in said second vector register to the real input values in said first vector register and simultaneously vector subtracting the real input values in said second vector register from the imaginary input values in said first vector register;

(j) vector subtracting the imaginary input values in said second vector register from the real input values in said first vector register and simultaneously vector adding the real input values in said second vector register to the imaginary input values in said first vector register; and (k) repeating steps (h) through (j) until said all input values in said first and second arrays have been processed.

4. The method of claim 1, wherein step (b) further comprises the steps of:

(l) loading a plurality of input values from said first array into a first vector register and input values from said second array into a second vector register, wherein the plurality of input values loaded into said second vector register correspond to a twiddle factor;

(m) performing a vector multiply operation between real components of the twiddle factor and said first vector register and storing the results in a third vector register;

(n) performing a positive vector multiply accumulate operation on imaginary components of the twiddle factor and real input values in said third vector register and simultaneously performing a negative vector multiply accumulate operation on imaginary input values in said third vector register;

(o) vector subtracting said third vector register from said first vector register;

(p) vector adding said third vector register to said first vector register; and (q) repeating steps (l) through (p) until said all input values in said first and second arrays have been processed.

5. The method of claim 1, wherein the real and imaginary input values of the first and second arrays have an associated twiddle factor.

6. The method of claim 1, wherein the real and imaginary input values of the first and second arrays have an associated twiddle factor with two sets of identical values.

7. The method of claim 1, wherein the real and imaginary input values of the first and second arrays have an associated twiddle factor with four sets of identical values.

8. A computer system for performing a N-point FFT, the system comprising:

a vector process with vector operand routing and multiple operations per instruction;

means for repetitively sub-dividing a N-point Discrete Fourier Transform into N/2-point Discrete Fourier Transforms until only a plurality of 2-point Discrete Fourier Transforms remain;

means for simultaneously vector processing at least two of the 2-point Discrete Fourier Transforms using the vector processor; and means for simultaneously cumulating the results of at least two of the 2-point Discrete Fourier Transforms from each of the sub-divided N/2-point Discrete Fourier Transforms to generate the result of said N-point Discrete Fourier Transform.

9. A computer program product for controlling a vector process or, the program comprising:

a computer readable medium;

means on said computer readable medium for repetitively sub-dividing a N-point Discrete Fourier Transform into N/2-point Discrete Fourier Transforms until only a plurality of 2-point Discrete Fourier Transforms remain;

means on said computer readable medium for simultaneously vector processing at least two of the 2-point Discrete Fourier Transforms using the vector processor; and means on said computer readable medium for simultaneously cumulating the results of at least two of the 2-point Discrete Fourier Transforms from each of the sub-divided N/2 Discrete Fourier Transforms to generate the result of said N-point Discrete Fourier Transform.

10. A system for performing a Fast Fourier Transform comprising:

a processor;

a multimedia extension unit coupled to the processor having operand routing and slot selectable operation;

a code segment for execution by said processor and said multimedia extension unit, said code segment including:

a first code for repetitively sub-dividing said N-point Discrete Fourier Transform into N/2-point Discrete Fourier Transforms until only a plurality of 2-point Discrete Fourier Transform remains;

a second code for simultaneously vector processing at least two of the 2-point Discrete Fourier Transform using the vector processor; and a third code for simultaneously cumulating the results of at least two of the 2-point Discrete Fourier Transforms from each of the sub-divided N/2-point Discrete Fourier Transforms to generate the result of said N-point Discrete Fourier Transform.

* * * * *